United States Patent
Linnell et al.

(10) Patent No.: US 9,555,545 B2
(45) Date of Patent: Jan. 31, 2017

(54) SYSTEMS AND METHODS FOR TIME-BASED PARALLEL ROBOTIC OPERATION

(71) Applicant: Bot & Dolly, LLC, San Francisco, CA (US)

(72) Inventors: Jeffrey Linnell, Woodside, CA (US); Kendra Byrne, San Francisco, CA (US)

(73) Assignee: Bot & Dolly, LLC, San Francisco, CA (US)

(*) Notice: Subject to any disclaimer, the term of this patent is extended or adjusted under 35 U.S.C. 154(b) by 13 days.

(21) Appl. No.: 14/333,311

(22) Filed: Jul. 16, 2014

(65) Prior Publication Data

US 2015/0336269 A1   Nov. 26, 2015

Related U.S. Application Data

(60) Provisional application No. 62/001,521, filed on May 21, 2014.

(51) Int. Cl.
*B25J 9/16* (2006.01)
*B25J 9/22* (2006.01)
(Continued)

(52) U.S. Cl.
CPC ............. *B25J 9/1656* (2013.01); *B25J 9/1666* (2013.01); *B25J 9/1682* (2013.01);
(Continued)

(58) Field of Classification Search
CPC ....... B25J 9/1656; B25J 9/1669; B25J 9/1682; G05B 2219/40307; G05B 2219/33097; G05B 2219/33144
See application file for complete search history.

(56) References Cited

U.S. PATENT DOCUMENTS 5,950,006 A   9/1999   Crater et al.
6,004,016 A   12/1999  Spector
(Continued)

FOREIGN PATENT DOCUMENTS

DE   102005040714   3/2007
JP   2003200368     7/2003
WO   2014/003864    1/2014

OTHER PUBLICATIONS

Chiddarwar, et al., "Conflict free coordinated path planning for multiple robots using a dynamic path modification sequence," Robotics and Autonomous Systems, vol. 59, No. 7-8, Jul. 1, 2011, pp. 508-518.

(Continued)

*Primary Examiner* — Khoi Tran
*Assistant Examiner* — Dale Moyer
(74) *Attorney, Agent, or Firm* — McDonnell Boehnen Hulbert & Berghoff LLP

(57) ABSTRACT

Example systems and methods may allow for parallel operation of robotic devices within a workcell, such as industrial robots controlled to manufacture an output product. One example method includes receiving ordered sequences of operations for a plurality of corresponding robotic devices, determining time-based sequences of operations for each of the robotic devices, where a time-based sequence of operations indicates positions within the workcell at corresponding timesteps of a global timeline, determining one or more potential collisions involving the robotic devices that would result from parallel execution of the time-based sequences of operations within the workcell, modifying the time-based sequences of operations in order to prevent the one or more potential collisions, and providing instructions for parallel execution of the modified time-based sequences of opera- (Continued)

tions at timesteps of the global timeline by the robotic devices within the workcell.

20 Claims, 18 Drawing Sheets

(51) Int. Cl.
    *B25J 9/10*     (2006.01)
    *B25J 9/06*     (2006.01)

(52) U.S. Cl.
    CPC .............. *G05B 2219/39135* (2013.01); *G05B 2219/40475* (2013.01); *G05B 2219/40477* (2013.01); *Y10S 901/02* (2013.01)

(56) References Cited

U.S. PATENT DOCUMENTS

| | | | |
|---|---|---|---|
| 6,161,051 | A | 12/2000 | Hafemann et al. |
| 6,522,951 | B2 | 2/2003 | Born et al. |
| 6,718,533 | B1 | 4/2004 | Schneider et al. |
| 7,298,385 | B2 | 11/2007 | Kazi et al. |
| 7,542,918 | B2 | 6/2009 | Rolleston Phillips |
| 7,590,680 | B2 | 9/2009 | Fernando et al. |
| 7,890,194 | B2 | 2/2011 | Pannese |
| 7,945,348 | B2 | 5/2011 | Pannese et al. |
| 8,073,567 | B2 | 12/2011 | Nishi et al. |
| 8,082,769 | B2 | 12/2011 | Butscher et al. |
| 8,229,587 | B2 | 7/2012 | Shieh et al. |
| 8,483,881 | B2 | 7/2013 | Ermakov et al. |
| 8,614,559 | B2 | 12/2013 | Kassow et al. |
| 8,639,666 | B2 | 1/2014 | Densham et al. |
| 8,660,738 | B2 | 2/2014 | Faivre et al. |
| 2001/0004718 | A1 | 6/2001 | Gilliland et al. |
| 2004/0199290 | A1* | 10/2004 | Stoddard ............... B25J 9/1669 700/248 |
| 2005/0119791 | A1 | 6/2005 | Nagashima |
| 2005/0273200 | A1 | 12/2005 | Hietmann et al. |
| 2006/0145647 | A1 | 7/2006 | Kitatsuji et al. |
| 2006/0200254 | A1 | 9/2006 | Krause |
| 2006/0276934 | A1 | 12/2006 | Nihei et al. |
| 2006/0287769 | A1* | 12/2006 | Yanagita ............... B25J 9/1669 700/245 |
| 2008/0014058 | A1 | 1/2008 | Hongkham et al. |
| 2009/0112350 | A1 | 4/2009 | Yuan et al. |
| 2010/0312387 | A1 | 12/2010 | Jang et al. |
| 2010/0332017 | A1 | 12/2010 | Stummer |
| 2011/0066282 | A1 | 3/2011 | Bosscher et al. |
| 2012/0072019 | A1 | 3/2012 | Sanders et al. |
| 2012/0188350 | A1 | 7/2012 | Hammond et al. |
| 2012/0215354 | A1 | 8/2012 | Krasny et al. |
| 2012/0307027 | A1 | 12/2012 | Popovic et al. |
| 2013/0331959 | A1 | 12/2013 | Kawai |

OTHER PUBLICATIONS

Montano, et al., "An on-line coordination algorithm for multi-robot systems," 2013 IEEE 18th Conference on Emerging Technologies & Factory Automation (ETFA), IEEE, Sep. 10, 2013, pp. 1-7.
International Search Report and Written Opinion mailed Jul. 29, 2015 for PCT/US2015/028526 filed Apr. 20, 2015.
Bengtsson, K. et al., "Sequence Planning Using Multiple and Coordinated Sequences of Operations," IEEE Transactions on Automation Science and Engineering, 2012, pp. 308-319, vol. 9, No. 2.
Chen et al., "Simulation and Graphical Interface for Programming and Visualization of Sensor-based Robot Operation," Proceedings of the 1992 IEEE International Conference on Robotics and Automation, Nice, France, May 1992, pp. 1095-1110.
El-Hakim, "A system for indoor 3—d mapping and virtual environments," Proceedings of the SPIE—The International Society for Optical Engineering, 1997, pp. 21-35, vol. 3174.
Li et al., "Fuzzy Target Tracking Control of Autonomous Mobile Robots by Using Infrared Sensors," IEEE Transactions on Fuzzy Systems, Aug. 2004, pp. 491-501, vol. 12, No. 4.
Roll Jr. et al., "Targeting and sequencing algorithms for the Hectospec's optical fiber robotic positioner,"Proceedings of the SPIE—The International Society for Optical Engineering, 1998, pp. 324-332, vol. 3355.
Sanhoury et al., "Switching between formations for multiple mobile robots via synchronous controller," 2012 IEEE 8th International Colloquium on Signal Processing and its Applications (CSPA), 2012, pp. 352-357.
Zhang, Peng, "Chapter 3—System Interfaces for Industrial Control," Industrial Control Technology: A Handbook for Engineers and Researchers, 2008, pp. 259-427.

* cited by examiner

SYSTEMS AND METHODS FOR TIME-BASED PARALLEL ROBOTIC OPERATION

CROSS REFERENCE TO RELATED APPLICATION

The present application claims priority to U.S. Provisional patent application Ser. No. 62/001,521, filed on May 21, 2014, and entitled "Systems and Methods for Time-Based Parallel Robotic Operation," which is herein incorporated by reference as if fully set forth in this description.

BACKGROUND

Unless otherwise indicated herein, the materials described in this section are not prior art to the claims in this application and are not admitted to be prior art by inclusion in this section.

Automated manufacturing processes may involve the use of one or more robotic devices that may be used to construct an output product, such as a car, a wall, a piece of furniture, or any number of other physical fabrications. The robotic devices may be equipped with end-effector-mounted tools, such as a gripper or a drill, that may be used during a construction process. The robotic devices may be programmed with sequences of specific motion commands and commands for other operations in order to cause the robotic devices to complete a manufacturing process.

SUMMARY

The present disclosure provides methods and apparatuses that may help to allow for time-based, parallel execution of robot operations within a workcell. The workcell may be a manufacturing environment or other environment containing one or more robotic devices and/or other components to enable an automated robotic process. Within examples, sequential operations may be received that indicate sequences of target positions for a plurality of robotic devices to move through within the workcell. Time-based sequences of operations may then be determined for each robotic device. The time-based sequences may indicate positions of the robotic devices at timesteps of a global timeline, including the received target positions. Possible collisions resulting from parallel execution of the time-based sequences may be identified, and modifications of the time-based sequences may be determined to prevent the collisions. The modified time-based sequences of operations may then be provided to the robotic devices for parallel execution within the workcell.

In one example, a method is provided that includes receiving ordered sequences of operations for a plurality of corresponding robotic devices, where an ordered sequence of operations includes an ordered sequence of target positions within a workcell. The method may also include determining, by a computing device, time-based sequences of operations for each of the robotic devices, where a time-based sequence of operations indicates positions within the workcell at corresponding timesteps of a global timeline, where the positions within a time-based sequence of operations include the target positions from the ordered sequence of operations for the corresponding robotic device. The method may further include determining one or more potential collisions involving the robotic devices that would result from parallel execution of the time-based sequences of operations within the workcell. The method may additionally include modifying the time-based sequences of operations in order to prevent the one or more potential collisions. The method may further include providing instructions for parallel execution of the modified time-based sequences of operations at timesteps of the global timeline by the robotic devices within the workcell.

In a further example, a system including a non-transitory computer-readable medium and program instructions stored on the non-transitory computer-readable medium is disclosed. The program instructions may be executable by at least one processor to receive ordered sequences of operations for a plurality of corresponding robotic devices, where an ordered sequence of operations comprises an ordered sequence of target positions within a workcell. The program instructions may further be executable to determine time-based sequences of operations for each of the robotic devices, where a time-based sequence of operations indicates positions within the workcell at corresponding timesteps of a global timeline, where the positions within a time-based sequence of operations include the target positions from the ordered sequence of operations for the corresponding robotic device. The program instructions may also be executable to determine one or more potential collisions involving the robotic devices that would result from parallel execution of the time-based sequences of operations within the workcell. The program instructions may additionally be executable to modify the time-based sequences of operations in order to prevent the one or more potential collisions. The program instructions may further be executable to provide instructions for parallel execution of the modified time-based sequences of operations at timesteps of the global timeline by the robotic devices within the workcell.

In another example, a non-transitory computer readable medium having stored therein instructions, that when executed by a computing system, cause the computing system to perform functions is disclosed. The functions may include receiving ordered sequences of operations for a plurality of corresponding robotic devices, where an ordered sequence of operations includes an ordered sequence of target positions within a workcell. The functions may also include determining time-based sequences of operations for each of the robotic devices, where a time-based sequence of operations indicates positions within the workcell at corresponding timesteps of a global timeline, where the positions within a time-based sequence of operations include the target positions from the ordered sequence of operations for the corresponding robotic device. The functions may further include determining one or more potential collisions involving the robotic devices that would result from parallel execution of the time-based sequences of operations within the workcell. The functions may additionally include modifying the time-based sequences of operations in order to prevent the one or more potential collisions. The functions may further include providing instructions for parallel execution of the modified time-based sequences of operations at timesteps of the global timeline by the robotic devices within the workcell.

In yet another example, a system may include means for receiving ordered sequences of operations for a plurality of corresponding robotic devices, where an ordered sequence of operations includes an ordered sequence of target positions within a workcell. The system may also include means for determining time-based sequences of operations for each of the robotic devices, where a time-based sequence of operations indicates positions within the workcell at corresponding timesteps of a global timeline, where the positions within a time-based sequence of operations include the target positions from the ordered sequence of operations for the corresponding robotic device. The system may further include means for determining one or more potential collisions involving the robotic devices that would result from parallel execution of the time-based sequences of operations within the workcell. The system may additionally include means for modifying the time-based sequences of operations in order to prevent the one or more potential collisions. The system may further include means for providing instructions for parallel execution of the modified time-based sequences of operations at timesteps of the global timeline by the robotic devices within the workcell.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
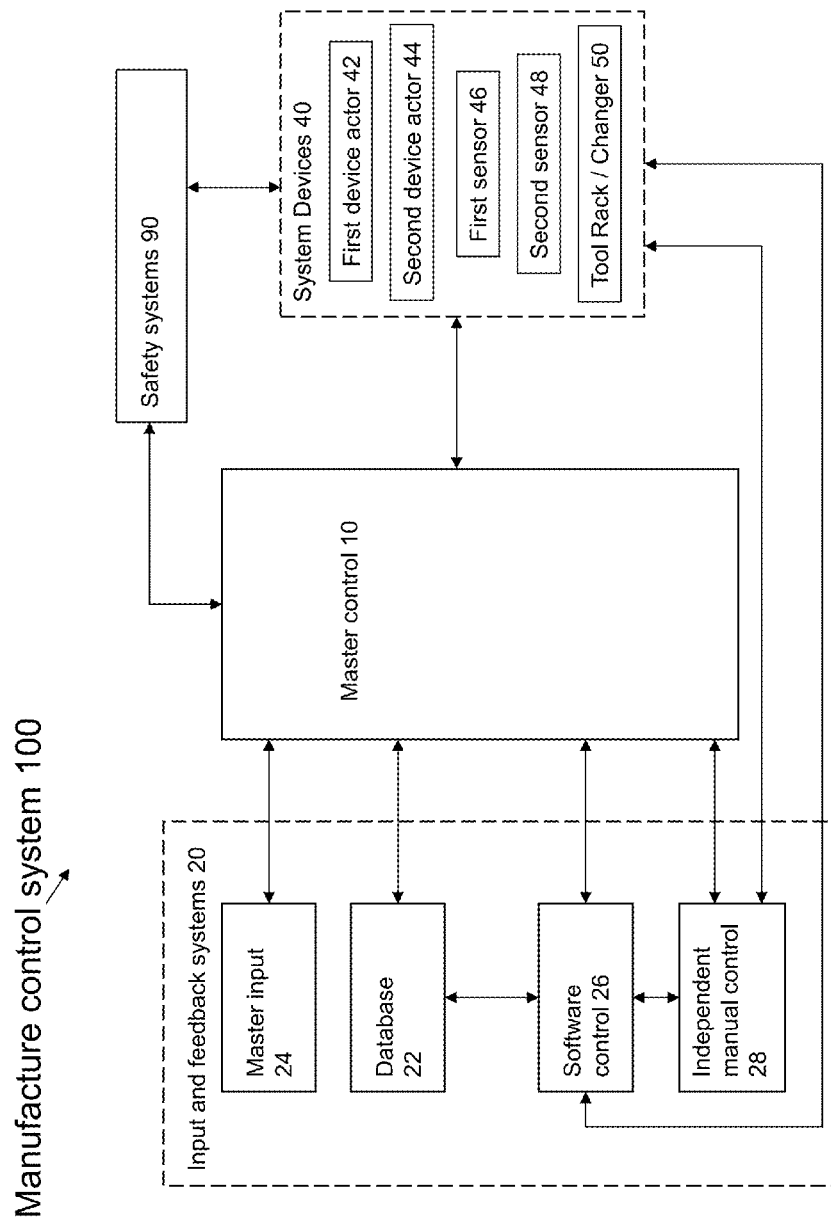
FIG. 1 shows a block diagram of a manufacture control system, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

Example systems and methods may help to provide for parallel operation of robotic devices within a workcell, such as industrial robots controlled to manufacture an output product. Sequences of robot operations, including robot movements and tool actions, may first be provided corresponding to different robotic devices within the workcell. In some instances, these sequences may be generated by a user from a software authoring environment. In other examples, sequences for individual robots may have been previously programmed and stored for later execution. The sequences of robot operations may indicate sequences of target positions (e.g., positions with six degrees of freedom) for the effector of a robotic device to progress through within the workcell. Within examples, sequences of robot operations may be converted into time-based sequences with reference to a global timeline to allow for parallel execution within the workcell.

In further examples, time-based sequences of operations for the robotic devices may indicate positions of an end effector of one of the robotic devices at timestamps along the global timeline. In some cases, a particular time interval may separate consecutive timestamps. For instance, in one example, the position of each robotic device may be determined every 12 milliseconds along the timeline. In other examples, a different time resolution may be used, possibly depending on available hardware or communication systems within a particular workcell.

In additional examples, the time-based sequence of operations for a robotic device may include the target positions from the corresponding sequence of operations for the robotic device. For example, the target positions may define a motion path through the workcell for the robotic device to follow (e.g., during a construction process). The time-based sequence may include the target positions in order to cause the robotic device to move through the same motion path.

In further examples, additional positions for the robotic device may be inserted between consecutive target positions in determining the time-based sequence for a robotic device. For instance, a time interval of 12 milliseconds may be used for a time-based sequence, but the sequential operations for a robotic device may only include target positions that can be reached by the robotic device roughly every second. In such an example, positions may be determined in between consecutive target positions in order to provide a smoother motion path for the robotic device. For instance, instead of moving through straight lines connecting consecutive target positions, continuous curves may be used. In additional examples, positions may be selected in order to minimize the amount of time required for the robotic device to travel from one target position to the next.

In further examples, possible collisions resulting from parallel execution of robot operations by multiple robotic devices within a workcell may be predicted. For instance, the time-based sequences of operations for several robotic devices may be synchronized to a common clock with a particular timestep resolution. Accordingly, the position of each robotic device within the workcell may be determined at timesteps along the global timeline and used to determine when collisions may occur. When possible collisions are detected, one or more of the time-based sequences of operations may be modified in order to allow for parallel execution without collision.

In some examples, time-based sequences of operations may be modified to avoid collisions while attempting to minimize the amount of time required to complete a process (e.g., a manufacturing process). In one example, the rate of operation of one or more of the robotic devices may be modified at one or more points along the global timeline. For instance, a particular robot may be slowed down in order to avoid collision with a second acting robot in the workcell. In further examples, velocity curves relative to the global timeline may be determined for each of the robotic devices in an effort to allow the robotic devices to collectively operate as fast as possible while avoiding any collisions in the workcell.

In other examples, one or more time-based sequences of operations may be modified to avoid collisions in other ways as well or instead. For instance, operations may be inserted to cause one or more of the devices to hold position within the workcell for a particular length of time within the global timeline. For example, a first robot may be commanded to hold position until a second robot completes a particular motion path through the workcell, in additional examples, positions between target positions within the time-based sequences of operations may be determined in order to avoid collisions, independently or in conjunction with timing modification. For instance, a first robot may be commanded to move around an area occupied by another robot to reach a particular target position.

In further examples, the sequential operations for the robotic devices may include sync points corresponding to operations within each robot's sequence of operations that must be reached before any of the robots can continue executing operations. For instance, sync points may be used to ensure no collisions occur from simultaneous operation within a workcell. By converting to time-based sequences of operations, some sync points may not be necessary to avoid collisions in some examples. Instead, collision detection may be done based on positions of robotic deices at timesteps along the global timeline. However, in some examples, certain operations may still need to be synchronized in time-based mode. For example, two robotic devices may be operating on a particular component within the workspace (e.g., a first robotic device may insert a screw into a board being held by a second robotic device). In such examples, these sync points may be identified as anchor points requiring synchronization in time-based mode while other sync points may be removed when converting to time-based mode.

Example systems, including various software and hardware components, will be described below. It should be understood that alternative systems, which may omit certain components, combine components, and/or add additional components, may also employ the disclosed methods in some examples as well.

II. EXAMPLE CONTROL SYSTEMS

Example embodiments may provide for motion planning and control of multi-axis robotic systems for use in the manufacturing and making industries. Example design-to-production systems may allow users to change parameters describing an output product on the front end, with the effects propagated through to a product manufactured by one or more robotic devices using one or more tools. In some examples, users may be provided with a graphical interface that allows for the configuration of the robot actors using a diverse toolset in order to automate the building process. In further examples, robot motions may be abstracted so that users don't have to program specific robot commands (e.g., motion commands or tool commands) in order to control the building process. Accordingly, users may be able to design a building process without specific knowledge of commands for particular types of robots. Additionally, users may be provided with one or more interfaces that allow for varying amounts of control over specific robot operations within a manufacturing process, during offline motion programming and/or during runtime.

In further examples, users may be provided with a three-dimensional (3D) modeling graphical interface that allows the user to alter one or more variables describing a physical workcell and/or a desired output product that affect a building process in the physical world. Additionally, the user interface may provide abstract ways to represent physical objects digitally as nodes within a software environment. In particular, the user experience may enable users to select from an array of tools which can be configured and combined in a number of different ways to control different types of robot actors and hardware components within a physical workcell.

In further examples, the physical workcell may include a physical stage or stages on which a physical building process is planned or is occurring within the physical world. In some examples, the physical workcell may include a variety of different robot actors and other hardware components as well as physical materials that may be used in the building process. In further examples, the physical workcell may contain a tool rack and/or an automated tool changer. In additional examples, the physical workcell may contain one or more different types of sensors. Also, the physical workcell may include any number of different dimensions, including platforms for particular building activities.

It should be understood that the present disclosure is not to be limited in terms of the particular embodiments described in this application, which are intended as illustrations of various aspects. Numerous components of example manufacturing systems are described herein. Systems that contain only some of those components or any combination of such components are contemplated as well. Many modifications and variations can be made without departing from the spirit and scope of the disclosed systems and methods. Functionally equivalent methods and apparatuses within the scope of the disclosure, in addition to those enumerated herein, will be apparent to those skilled in the art.

Example embodiments may involve use of a manufacture control system to create automated programming of robotics arms during a building process. FIG. 1 describes an example manufacture control system 100. Manufacture control system 100 may be part of a manufacturing environment used to control one or more robotic devices to use one or more tools to construct some output product. Manufacture control system 100 may comprise a master control 10, input and feedback systems 20, system devices 40, and safety systems 90. From the most basic perspective, manufacture control system 100 may function when an input system 20 provides instructions to one of system devices 40 via master control 10.

In one potential embodiment as part of a manufacture control system 100, input and feedback systems 20 may include a database 22, a master input 24, a software control 26, and an independent manual control 28. As part of the input and feedback systems 20, database 22 may operate to provide a set of timing and position data to direct all or a portion of device actors 42, 44 within system devices 40. Two device actors 42, 44 are shown in FIG. 1, but any number of device actors could be used within manufacture control system 100. Alternatively, database 22 may store data being created by manual or individual movement or data input related to operation and function of device actors 42, 44. Database 22 may also store data created independently of device actors 42, 44, such as data created using software modeling features of a software control 26.

A master input 24 may be any device that functions to operate all of the device actors 42, 44 associated with a particular building process being executed by manufacture control system 100. Master input 24 may function by sending input control signals to master control 10. Master control 10 may then adapt the signal from master input 24 to send individual control signals to a plurality of robot actors operating as device actors 42, 44 for a particular manufacturing process. In one potential embodiment, every individual device of device actors 42, 44 may be provided a control signal from master control 10 when a signal is received from master input 24, including a signal to maintain a status quo or non-action to devices that are not operating as device actors 42, 44 for a particular part of the manufacturing process. In an alternative embodiment, a portion of the device actors 42, 44 connected as part of manufacture control system 100 may not be sent any signal from master control 10 as part of the operation of motion control system 100 for a particular part of the manufacturing process.

In some examples, software control 26 may act as a replacement for master input 24 in sending control signals to the plurality of device actors 42, 44 via the master control 10. Alternately, software control 26 may control individual devices from among device actors 42, 44 to control particular operations of the individual device. In other potential embodiments, software control 26 may function to model the behavior of individual devices of device actors 42, 44 within a virtual modeling environment representative of a physical workcell. In such an embodiment, software control 26 may contain a software model for an individual device, which allows control signals to be created for the device without actually sending the control signals to the device. The control signals may then be stored in the software control 26, in database 22, within a computer memory component that is part of master control 10, or within computer memory that is part of the device of device actors 42, 44 for which the controls are being created. After the control signal is created by software control 26 and propagated to the appropriate storage location, a master control signal from software control 26 or from master input 24 may activate the control signal for the individual device to act in conjunction with other device actors 42, 44.

In further examples, certain devices of device actors 42, 44 may additionally have an independent manual control 28. As described above with respect to software control 26, control signals for an individual device may be created in software modeling. In addition or instead, a device may have independent manual control 28 that may be used to operate a device of device actors 42, 44. When a set of instructions is being created for an entire manufacturing process, the independent manual control 28 may be given input commands over time that are recorded to database 22 or a memory device of master control 10. During creation of a set of instructions using independent manual control 28, the independent manual control 28 may communicate directly with the associated device of device actors 42, 44. Alternatively, the independent manual control 28 may send a control signal to master control 10, which then conveys the signal to the associated device of device actors 42, 44.

The control signal may then be created either from the signal of the independent manual control 28 (e.g., a separate user interface), or from a measured feedback reading created by the operation of the associated device. Additionally, although in many situations, it may be preferable to have the independent manual control 28 actually control the associated device during control signal creation in real time, control signals may instead be created without controlling the device. For example, if input signals are expected for certain time marks, an independent manual control 28 may be operated independent of the related device, and the control operation may be recorded. Accordingly, instructions for individual device actors of device actors 42, 44 from independent manual control may be integrated into a building process as part of manufacture control system 100.

In further examples, master control 10 may allow for real-time control of components of a building system by providing a link between a virtual world (e.g., software control 26) and the physical world (e.g., a physical workcell containing device actors 42, 44). Accordingly, movements of a physical robot within the physical world may be used to drive the current position of a corresponding virtual robot in real time. Similarly, movements of a virtual robot may be used to drive the current position of a physical robot in the physical world as well or instead.

In one potential embodiment, individual control signals for specific device actors may be coordinated into a single file within a memory of a master control with a common base time provided by a master clock within the master control. During operation, the master control may extract control signals for each device actor and provide individual control signals to each device actor at the appropriate intervals. In an alternative embodiment, the master control signals maintain separate individual control signal files and timing data for different device actors, and synchronize the different control signals separately from the individual control files.

In another alternative embodiment, the control data for a portion of the device actors may be transferred by a master control to a memory within an associated individual device actor. During operation, device actors having control data within memory may receive a synchronization signal that indicates a location in a global timeline, a rate of progress through a global timeline, or both.

Network support may also enable communications from master control 10 to one or more of system devices 40. In one potential embodiment, a network may comprise an EtherCAT network operating according to IEEE 1588. In such an embodiment, packets may be processed on the fly using a field bus memory management unit in each slave node. Each network node may read the data addressed to it, while the telegram is forwarded to the next device. Similarly, input data may be inserted while the telegram passes through. The telegrams may only be delayed by a few nanoseconds. On the master side, commercially available standard network interface cards or an on-board Ethernet controller can be used as a hardware interface. Using these interfaces, data transfer to the master control via direct memory access may be achieved with no CPU capacity taken up for the network access. The EtherCAT protocol uses an officially assigned Ether Type inside the Ethernet Frame. The use of this Ether Type may allow transport of control data directly within the Ethernet frame without redefining the standard Ethernet frame. The frame may consist of several sub-telegrams, each serving a particular memory area of the logical process images that can be up to 4 gigabytes in size. Addressing of the Ethernet terminals can be in any order because the data sequence may be independent of the physical order. Broadcast, multicast, and communication between slaves are possible.

Transfer directly in the Ethernet frame may be used in cases where EtherCAT components are operated in the same subnet as the master controller and where the control software has direct access to the Ethernet controller. Wiring flexibility in EtherCAT may be further maximized through the choice of different cables. Flexible and inexpensive standard Ethernet patch cables transfer the signals optionally in Ethernet mode (100BASE-TX) or in E-Bus (LVDS) signal representation. Plastic optical fiber (POF) can be used in special applications for longer distances. The complete bandwidth of the Ethernet network, such as different fiber optics and copper cables, can be used in combination with switches or media converters. Fast Ethernet (100BASE-FX) or E-Bus can be selected based on distance requirements.

Further, such an embodiment using EtherCAT supports an approach for synchronization with accurate alignment of distributed clocks, as described in the IEEE 1588 standard. In contrast to fully synchronous communication, where synchronization quality suffers immediately in the event of a communication fault, distributed aligned clocks have a high degree of tolerance from possible fault-related delays within the communication system. Thus, data exchange may be completely done in hardware based on "mother" and "daughter" clocks. Each clock can simply and accurately the other clocks' run-time offset because the communication utilizes a logical and full-duplex Ethernet physical ring structure. The distributed clocks may be adjusted based on this value, which means that a very precise network-wide time base with a jitter of significantly less than 1 microsecond may be available.

However, high-resolution distributed clocks are not only used for synchronization, but can also provide accurate information about the local timing of the data acquisition. For example, controls frequently calculate velocities from sequentially treasured positions. Particularly with very short sampling times, even a small temporal jitter in the displacement measurement may lead to large step changes in velocity. In an embodiment comprising EtherCAT, the EtherCAT expanded data types (timestamp data type, oversampling data type) may be introduced. The local time may be linked to the measured value with a resolution of up to 10 ns, which is made possible by the large bandwidth offered by Ethernet. The accuracy of a velocity calculation may then no longer depend on the jitter of the communication system.

Further, in an embodiment where a network comprises EtherCAT, a hot connect function may enable parts of the network to be linked and decoupled or reconfigured "on the fly". Many applications require a change in I/O configuration during operation. The protocol structure of the EtherCAT system may take account these changing configurations.

In further examples, safety systems 90 may be provided for preventative safety in detecting potential collisions between device actors in modeling the motion of the actors through a global timeline. Further, such modeling through a global timeline may be used to set safety parameters for safety systems 90. Modeling of locations and velocities of device actors through a global timeline may enable identification of unsafe zones and unsafe times in an area of a physical workcell. Such an identification may be used to set sensing triggers of object detectors that are part of an example safety system. For example, if an area within 5 feet of a certain device actor is determined to be at risk of collision, and a buffer zone of 10 additional feet is required to insure safety during operation, a LIDAR detector may be configured to detect unexpected objects and movement within a 15 foot area of the device actor during operation, and to automatically create a safety shutdown if an object is detected. In an alternative embodiment, the LIDAR detector may be configured to create a warning signal if an object is detected in a periphery of the danger zone, and only to create a shutdown if the detected object is moving toward a potential impact zone.

In an alternate embodiment, safety systems 90 may include modeling of actors and models of defined safe zones. Analysis of the motion of the actors in software control may allow a modeled safety check to see if any actor collides with a defined safe zone. In some examples, safe zones may be defined by entry of fixed volumes of space into a software control, by image capture of a physical workcell. Safe zones may also be defined to be variable based on a detected motion, jerk, velocity, or acceleration of an object in a safe zone. In an alternate embodiment, a safe zone may be defined by input from transponder device data. For example, a transponder location device may be attached to a robotic device actor, and a safe zone defined by a distance from the transponder. The transponder may feed location data to software control, which may update safe zones within a software control or within a master safety control. In another embodiment, fixed safe zones may be defined within software control, and published prior to a safety PLC within a master safety control prior to operation of a building process.

In some examples, system devices 40 may additionally include one or more sensors 46 and 48, such as laser-based, infrared, or computer vision-based sensors. Master control 10 may stream data in from one or more different types of sensors located within the physical workcell. For instance, data from the sensors may reflect dimensions or other properties of parts and/or materials within a physical workcell, as well as how the parts and/or materials are currently positioned within the real world. This data may then be streamed out to one or more robotic device actors 42 and 44 within the environment to control robotic actions, such as to accurately define a pick-up point or to adjust the pressure applied to a particular material to avoid damaging the material.

In further examples, robotic device actor 42, 44 may be configurable to operate one or more tools for use in construction, such as spindles, grippers, drills, pincers, or welding irons. In some examples, robotic device actors 42, 44 may be able to switch between one or more tools during a building process using a tool rack and/or automated tool changer 50. For instance, master control 10 may contain programming logic in order to automate the selection and equipping of tools from tool rack 50. In other examples, instructions to cause one of the robotic device actors 42, 44 to change tools using the tool rack/tool changer 50 may come from independent manual control 28 as well or instead.

III. EXAMPLE SYSTEM DEVICES

Referring now to FIGS. 2A-2C and 3A-C, several non-limiting examples of system devices 40, including robotic device actors 42, 44 and a tool rack/tool changer 50 will be described. Although these figures focus on the use of robotic arms, other types of device actors 42, 44 or system devices 40 may be used in some examples as well or instead.

Figure 2A:
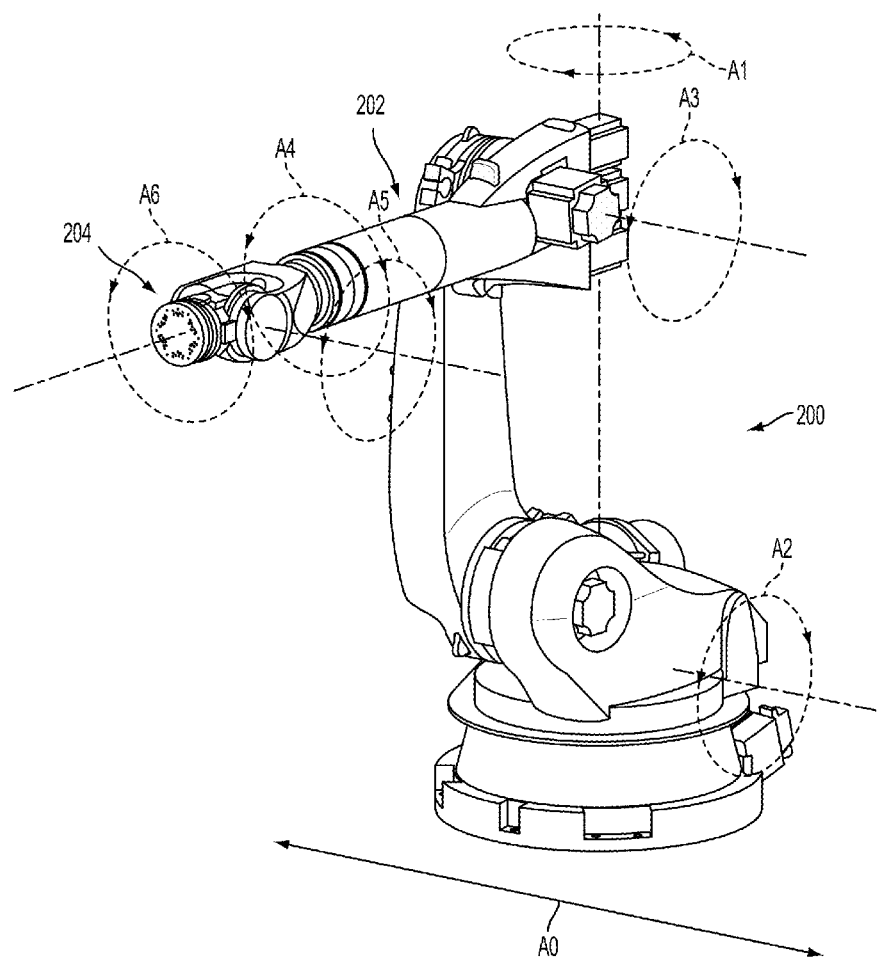
FIG. 2A shows a view of a robot with 7 degrees of freedom, according to an example embodiment.

FIG. 2A illustrates a robotic device actor, according to an example embodiment. In particular, robotic device actor 200 may include a robotic arm 202 with an end effector 204 capable of being equipped with one or more different tools. The robotic arm 202 may be capable of motion along six degrees of freedom, depicted in FIG. 2A as A1-A6. In certain examples, robotic device actor 200 may be further capable of motion along one or more axes A0, such as along a rail which is not shown that allows side to side movement. In certain embodiments, instructions may be given to position end effector 204 at a specific location, and the positions of the robotic arm 204 along A1-A6 and/or of robotic device actor 200 along one or more axes A0 may be calculated by a process of the related manufacture control system. In alternative embodiments, position control of robotic device actor 200 and/or robotic arm 202 may require separate, individual settings and control commands. Robotic devices operating with fewer degrees of freedom may be used in some examples as well or instead.

Figure 2B:
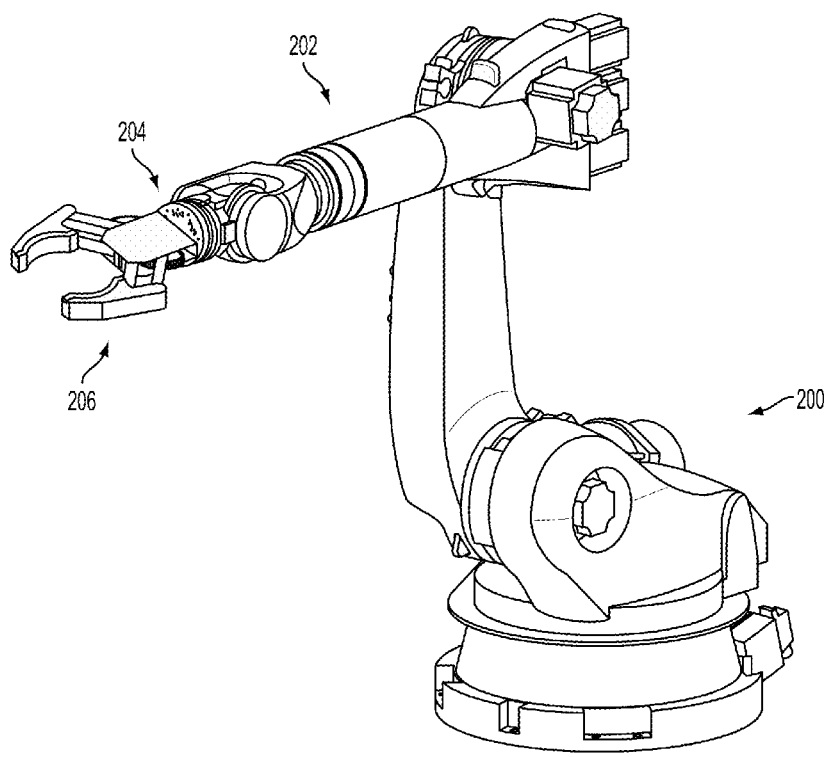
FIG. 2B shows a view of a robot with an attached gripper, according to an example embodiment.

FIG. 2B illustrates robotic device actor 200 equipped with a gripper 206. In particular, the gripper 206 may be placed at end effector 204 of the robotic arm 202. The gripper 206 may be used for various functions during a building process, such as picking up objects or parts, moving objects or parts, holding objects or parts, and/or placing objects or parts. A variety of different types of grippers may be used, such as a vacuum gripper, a tumble gripper, or a passive centering gripper. Additionally, grippers with different dimensions or other properties may be used, possibly to coincide with different types of robot actors within a physical workcell.

Figure 2C:
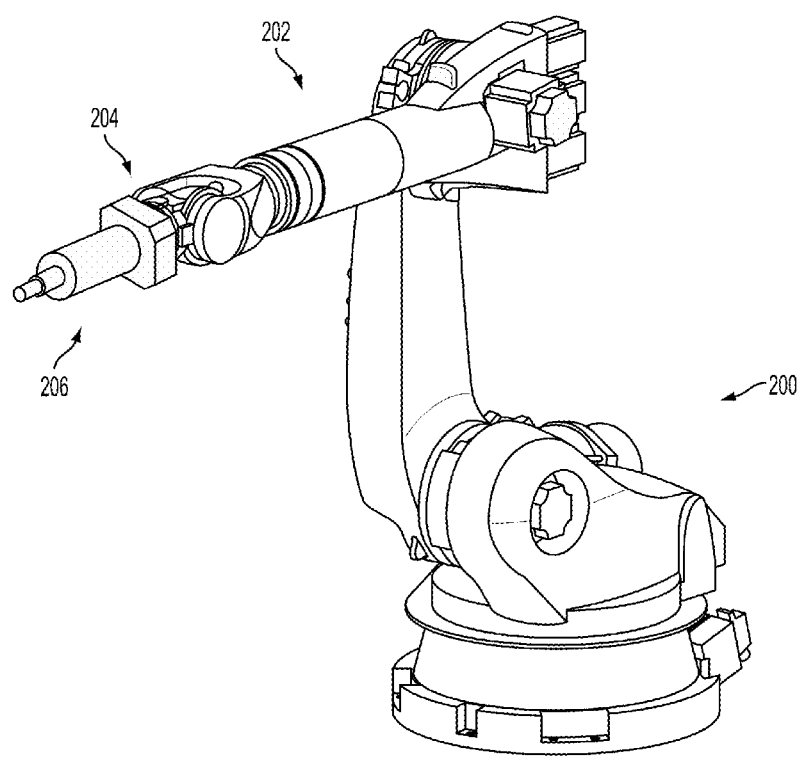
FIG. 2C shows a view of a robot with an attached spindle, according to an example embodiment.

FIG. 2C illustrates robotic device actor 200 equipped with a spindle 208. A spindle 208 may include a rotating axis for use in various functions within a building process, such as cutting materials, shaping materials, milling or routing. The spindle 208 could be a variety of different types, such as a grinding spindle, an electric spindle, a low-speed spindle, or a high-speed spindle. Additionally, spindles with different dimensions or other properties may be used, depending on the different types of robot actors within a physical workcell. In some examples, other types of tools may be used by robotic device actors as well or instead.

Figure 3A:
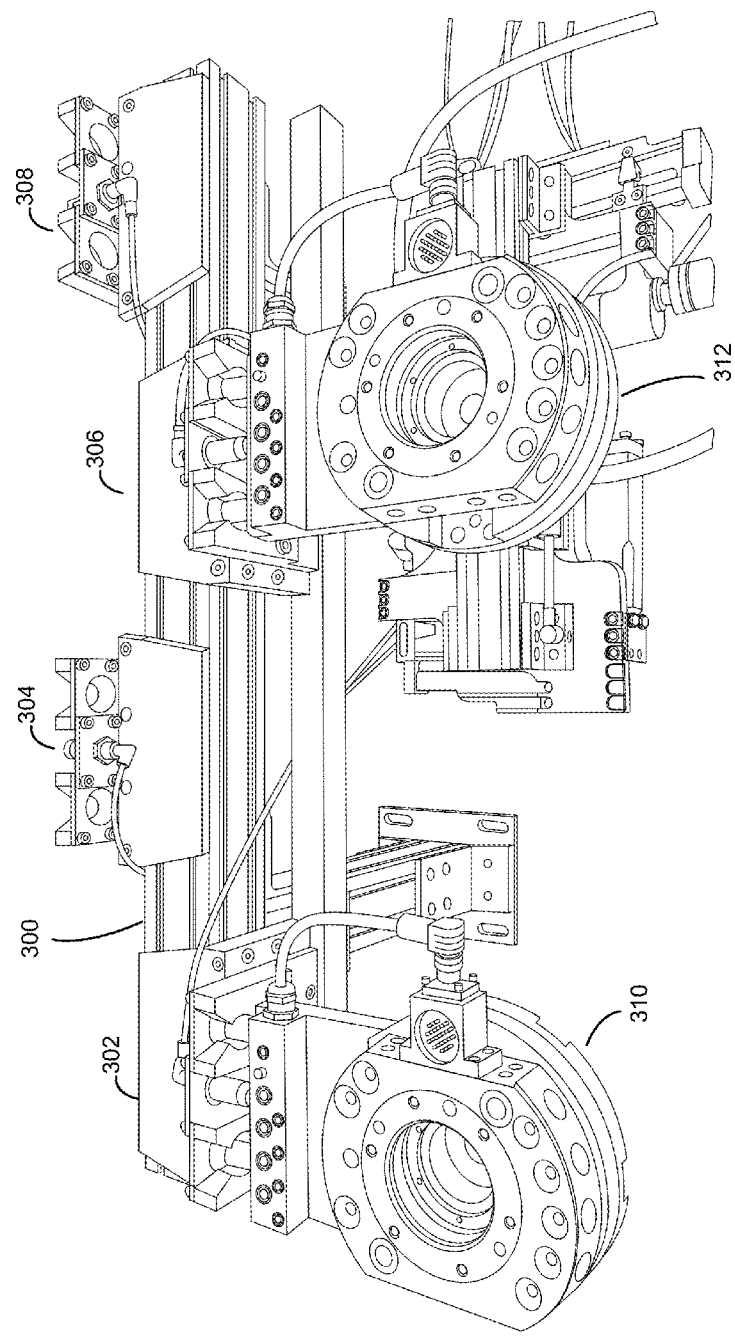
FIG. 3A shows a view of a tool rack, according to an example embodiment.

FIG. 3A illustrates a tool rack, according to an example embodiment. The tool rack may contain a number of different fabrication tools (e.g., spindles or grippers) and may be used along with an automated tool changer in order to equip robotic devices with particular tools to use within a physical workcell. In some examples, the tool rack may contain several tool rack modules 302, 304, 306, 308 positioned along a track 300, with each of the tool rack modules 302, 304, 306, 308 containing one or more particular tools. In some examples, one or more of the tool rack modules 302, 304, 306, 308 may be moveable along the track 300. In further examples, a tool rack module may be capable of interfacing with a slave module that allows for a particular tool to be selected from the tool rack module and then equipped onto a robotic device. For instance, referring to FIG. 3A, tool rack module 302 may interface with slave module 310 and tool rack module 306 may interface with slave module 312.

In order to facilitate tool changing, the tool rack modules may be equipped with built-in safety sensors to minimize the risk of accidental tool fetch and drop commands. Additionally, the tool change slave modules may include IO breakout boxes to simplify passing IO trigger signals to control tools. In some examples, the breakout boxes may interface with a timing control system, such as master control 10 described with respect to FIG. 1, that controls the robotic devices within a physical workcell. Master control 10 may be used to direct a tool change for a particular robotic device, which may be configured in advance using software control 26 and/or from independent manual control 28 during runtime.

Figure 3B:
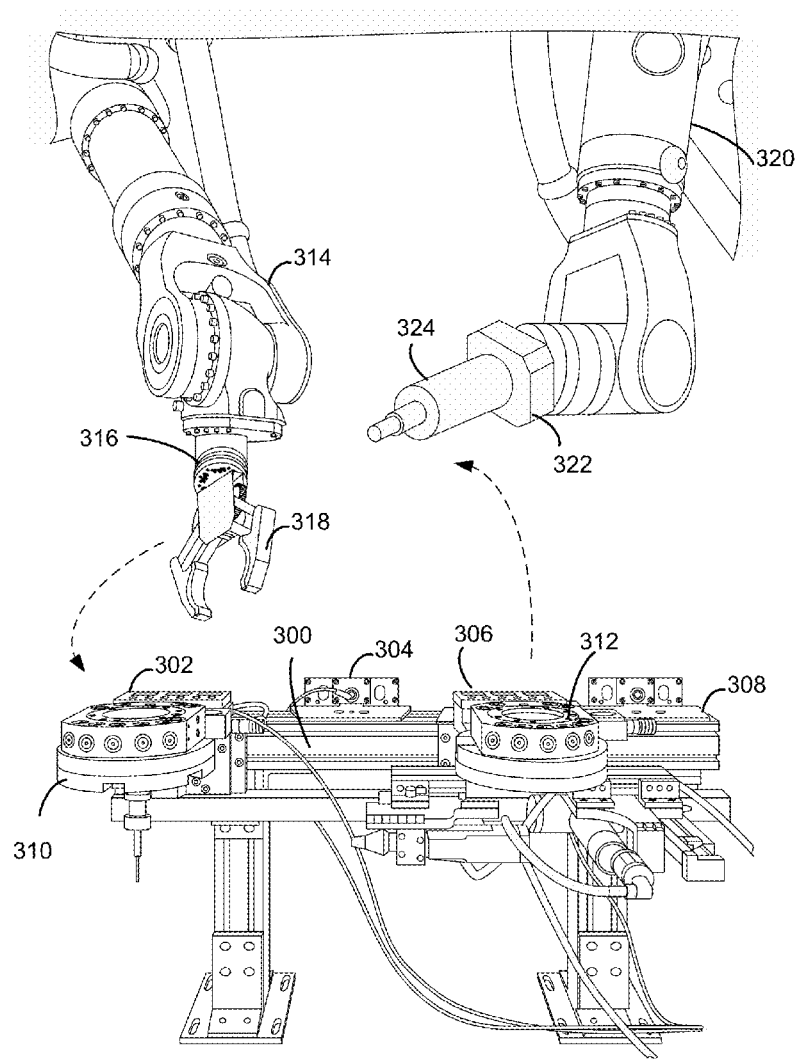
FIG. 3B shows a view of a tool rack and two robots, according to an example embodiment.

FIG. 3B illustrates use of the tool rack to equip robotic devices with tools, according to an example embodiment. In particular, a first robotic device 314 may move its end effector 316 to a position over a slave module 310 that interfaces with a tool rack module 302 of a tool rack. For instance, the robotic device 314 may currently be equipped with gripper 318, and may be controlled to move to the tool rack in order to place gripper 318 in the tool rack and equip a different tool held by tool rack module 302. Additionally, a second robotic device 320 may have positioned its end effector 322 on slave module 312 in order to equip spindle 324, which may have been held by slave module 312. After equipping spindle 324, robotic device 320 may then proceed to move away from the tool rack and complete operations using the spindle 324. The tool rack modules may be positioned on the tool rack so that multiple robotic devices may equip or change tools at the same time. In some examples, additional rack modules 304, 308 may contain additional tools that may be equipped by one or more robotic devices.

In further examples, instructions from a control system, such as master control 10 described with respect to FIG. 1, may be used in order to instruct a robotic device how to equip a tool during runtime (e.g., to determine where a tool is within the tool rack and solve an end effector problem in real time in order to position the end effector over a slave module to enable the robotic device to pick up the tool), hi additional examples, a drive system (e.g., a VFD used to supply power drive a spindle) may be mounted at a separate fixed location within a physical workcell in order to supply power on the tool changer system.

IV. EXAMPLE GRAPHICAL INTERFACES

Figure 4A:
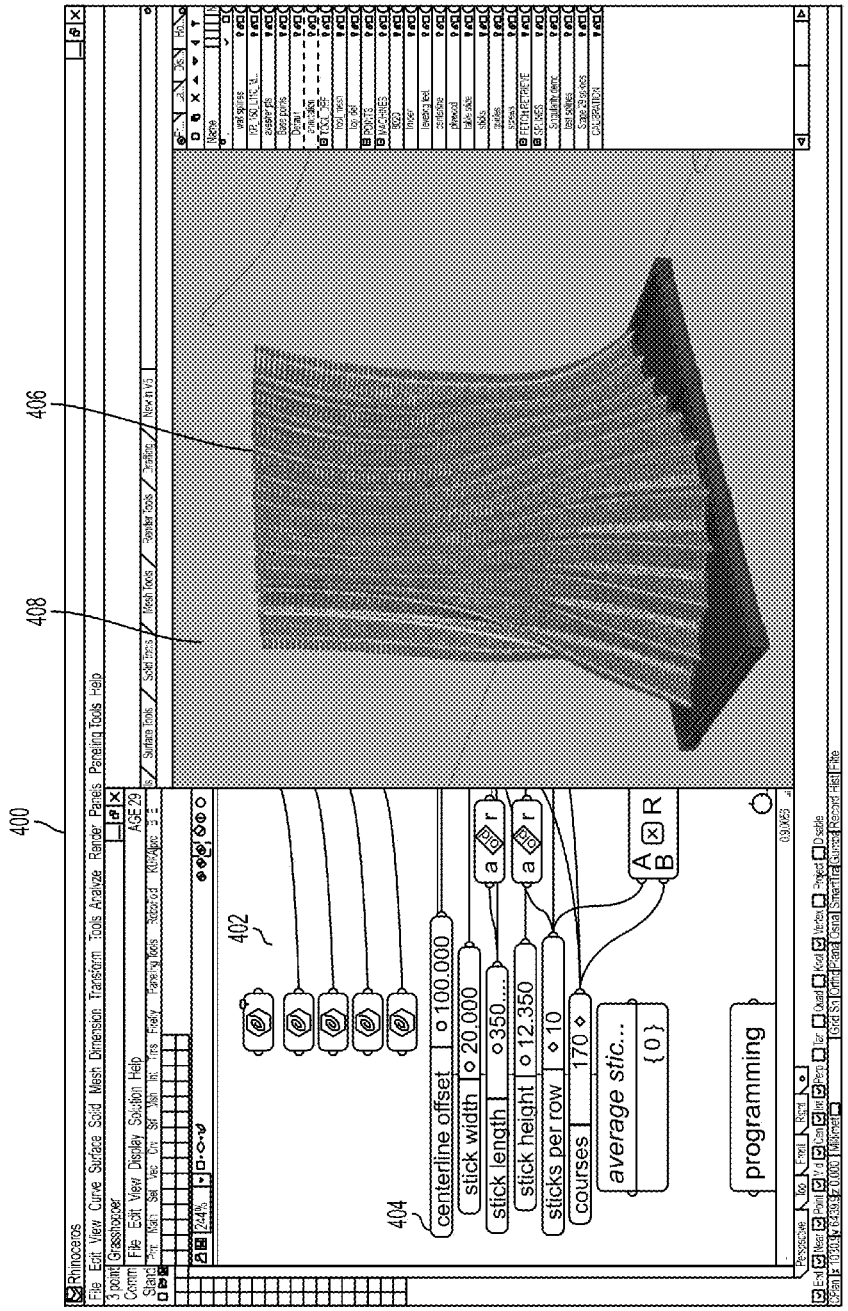
FIG. 4A shows a graphical interface with a 3D model, according to an example embodiment.

FIG. 4A shows a graphical interface containing a 3D model, according to an example embodiment. As shown, a graphical interface 400 may contain an input window 402 which may allow a user to enter parameters relating to an output product 406, such as a wall built using individual sticks. The input window 402 may allow the user to enter parameters 404 that may relate to aspects of the output product, including dimensions, density, curvature properties, other geometric properties, materials to be used, and/or other numeric inputs. The inputs may be used to derive a parametric solution for an output product 406. Additionally, the inputs may be used to generate a sketch of the output product 406 within a display window 408 of the graphical interface 400.

Figure 4B:
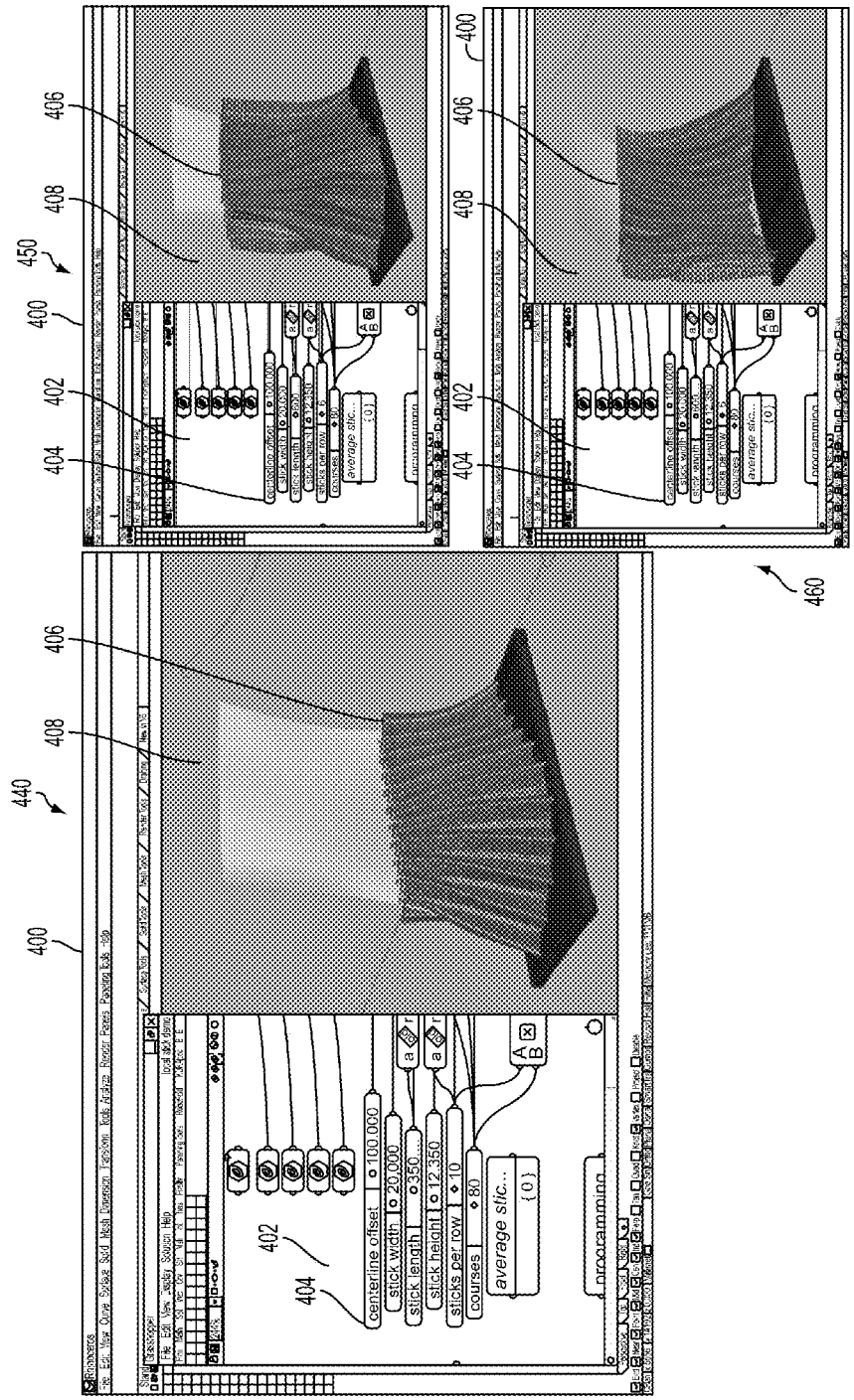
FIG. 4B shows additional graphical interfaces with 3D models, according to an example embodiment.

FIG. 4B shows three different output products based on different user input parameters, according to an example embodiment. A first view of the graphical interface 440 may contain an input window 402 and a display window 408. The input window 402 may allow a user to enter parameters 404 relating to a desired output product, including product dimensions, density, curve offsets, amount or type of curvatures, and/or other geometric or numerical inputs. Based on the input parameters 404, a geometric representation of the output product 406 may be displayed within the display window 408. In some examples, a user may modify individual parameters 404 in order to change aspects of the output product 406.

For instance, a second view of the graphical interface 450 shows a different output product 406 within the display window 408 based on different input parameters 404 within the input window 402. In this example, dimensions of the output product 406 and/or materials used to produce the output product 406 may be modified to produce an output product 406 with a greater height as shown in the second view 450. Further, a third view 460 shows another different output product 406 within the display window 408 based on different input parameters 404 within the input window 402. For example, parameters relating to the curvature of the output product may be modified by a user in order to produce another different output product 406 as shown in the third view 460.

Figure 5:
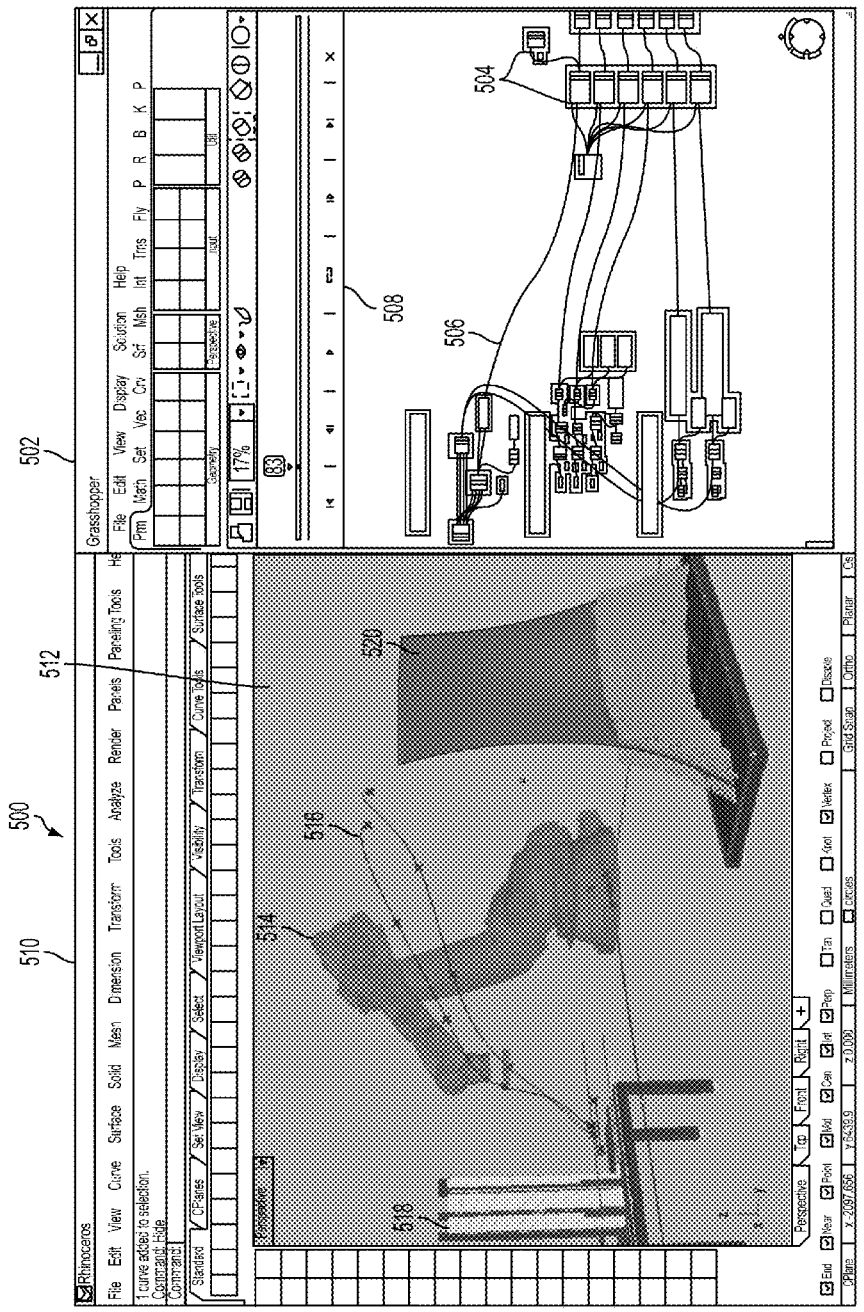
FIG. 5 illustrates a node-based graphical interface and a visualization of a building process, according to an example embodiment.

FIG. 5 shows a graphical interface for architecting a robotic building process, according to an example embodiment. For example, the graphical interface may be part of software control 26 as described above with respect to FIG. 1. As shown, a graphical interface 500 may contain an input window 502 which allows a user to control aspects of the building process, including nodes related to robot actors, tools, motion paths, and tool operations for use during construction. The graphical interface 500 may additionally contain a display window 510 which contains a 3D geometric view of the physical workcell, including components such as robot actors, tools, materials, and/or constructed output products. In example embodiments, the input window 502 may provide a visual programming interface or different type of interface that may allow a user to enter parameters describing a desired output product and/or information about the actors and tools to be used in the building process. Input data collected using the input window 502 may be used to control geometry and/or other aspects of the physical workcell displayed within the display window 510.

In one example, a user may input parameters to control a building process using an input window 502 containing a visual programming interface, such as an interface built using a visual programming language, such as a commercial software program known as Grasshopper. The interface may allow a user to include one or more nodes 504 which may represent components of the building process, such as robot nodes representing different types and/or configurations of robots, tool nodes representing different types and/or configurations of tools, IO nodes representing types of available IO, track nodes representing possible tracks of motion of robot actors, and command nodes for determining motion commands and other types of commands for robot actors.

As shown within window 502 of FIG. 5, individuals nodes 504 may be connected together using connectors 506. A connector 506 between two nodes may indicate that the output of a first node is to be used as an input to a second node. For instance, a single robot node may receive as inputs information from several different component nodes, such as nodes representing the type of robot, the type of tool used by the robot, a track the robot can travel along, and so on.

In further examples, the window 502 of FIG. 5 may contain a timeline 508. The timeline 508 may have a cursor representing a current timestamp (e.g., 83 as shown in the figure) which may represent a particular point in time of the manufacturing process. In addition, the timeline 508 may contain buttons to play through the building process at a particular speed, or fast-forward or rewind through the building process. The timeline 508 may be used to control the point in time at which the geometry and/or other aspects of the physical workcell are displayed within the display window 510. Further, the timeline 508 may be used to indicate a particular point in time either for purposes of simulating the building process or for visualizing within software an actual physical building process taking place within the physical world.

As shown in FIG. 5, the user interface may additionally contain display window 510 which may display geometry and/or other aspects of the physical workcell based on inputs from the input window 502. For example, the display window 510 may include geometry relating to robot actors, tools, building materials, robotic motion paths, and output products, among other things. In one example, the display window 510 may be designed using a commercial 3D modeling software, such as Rhinoceros, as shown within FIG. 5. The display window 510 may display geometry within a particular physical workcell 512. The display window 510 may include options to change the perspective of the physical workcell 512 and/or to zoom in or zoom out a view of the physical workcell 512.

The physical workcell 512 may include one or more robot actors 514. The robot actors 514 may be device actors 42 and/or 44 as described above with respect to FIG. 1 and/or robotic device 200 as described with respect to FIGS. 2A-2C. Support may be provided for numerous different types of multi-axis robotic systems of different types and/or from different manufacturers. In some examples, one or more of the robot actors 514 may be traditional six-axis robots. In additional examples, other types of robots that may be configured to operate along fewer or more axes may be included for use within the physical workcell 512 in addition or instead.

In further examples, robot actors may be represented within a software interface as robot nodes, which may be put together from a number of interchangeable component nodes, including robot nodes representing different makes and models of commercial robots, tool nodes representing different types of physical tools that may be used for construction such as grippers or spindles, IO nodes representing different types IO available to communicate with a robot actor and track nodes representing different types of axes that a robot can move along. In some examples, individual tools and/or tooling parameters (such as wrist mount offsets or tool center points) can be abstracted into components that can be assembled by a user into compound tools as well.

The display window 510 may additionally contain one or more motion paths 516 representing paths of motion of individual robot actors 514. The motion paths 516 may indicate paths to be taken by the robot actors 514 during the building process, such as to pick up materials and attach them to an object under construction. In some examples, the motion paths 516 may further indicate points at which particular input or output actions will occur. For instance, an "x" on a motion path 516 may indicate a point at which a robot actor 514 uses a tool such as a gripper to pick up a particular type of material. In further examples, the motion paths 516 may be synchronized with the timeline 508 from the input window 502. Accordingly, in some examples, the robot actors 514 may be made to move along the motion paths 516 to positions at particular points in time based on the timestamp indicated by the timeline 508.

The physical workcell 512 may additionally contain one or more materials 518 to be used during the building process, in this simplified example, the materials 518 consist of sticks used to construct a wall 520. Motion paths 516 may be determined for the robot actor 514 to take in order to move the individual sticks 518 onto the wall 520. In other examples, a variety of different types of materials, including connective materials such as glue, may be used simultaneously by the robot actors to construct more complex output products.

In further examples, the physical workcell 512 may also contain other components not shown in FIG. 5 that may be used in the building process. For instance, one or more sensors may be included to sense information about the robot actors and/or materials in the physical workcell in order to influence motion paths taken by the robot actors. For example, a torque sensor may be used to determine if a particular piece of material is likely to break under stress. A control system, such as master control 10 described above with respect to FIG. 1, may be used to interface with the robot actors and/or sensors within the physical workcell.

In some examples, the display window 510 may provide users with multiple 3D views of the physical workcell, and may allow a user to change the orientation and/or zoom of a particular view. In other examples, the display window 510 may present other types of representations of the physical workcell, such as numerical representations, as well or instead.

V. EXAMPLE SYSTEM WORKFLOW

Figure 6A:
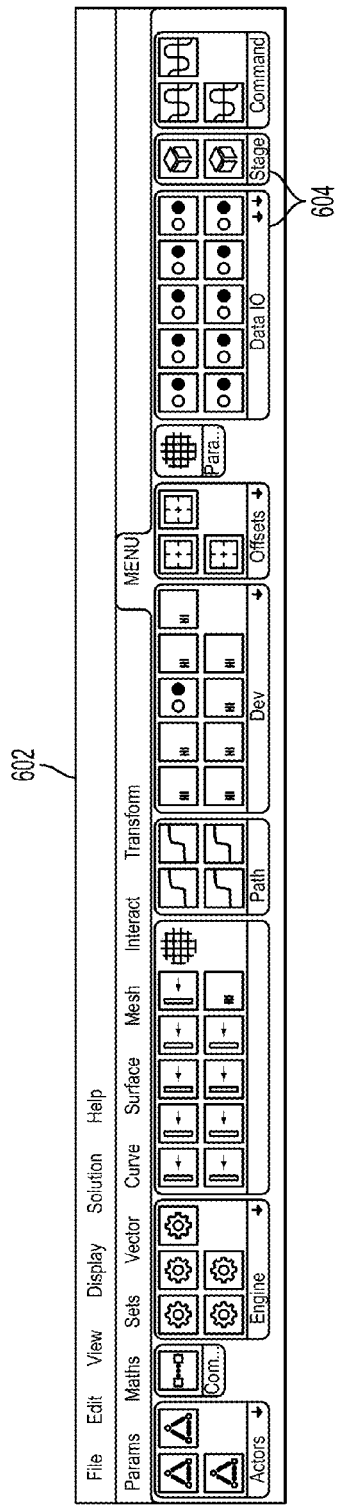
FIG. 6A illustrates a toolbar for a graphical interface, according to an example embodiment.

In some examples, an input window may additionally contain a toolbar containing digital tools to control aspects of the building process. FIG. 6A shows a toolbar for a graphical interface, according to an example embodiment. The toolbar 602 may be equipped with a variety of different toolsets 604 that may be used to design or control a building process within an input window of a graphical interface. Toolsets 604 may be provided with digital toots relating to generating robot motion paths, transforming between different planes or axes, describing robot actors, describing physical building tools, sequencing individual robot motions, communicating data input and/or output to and/or from robot actors, mapping between a virtual software environment and a physical workcell, and/or enabling visualization of a building process, for example.

Figure 6B:
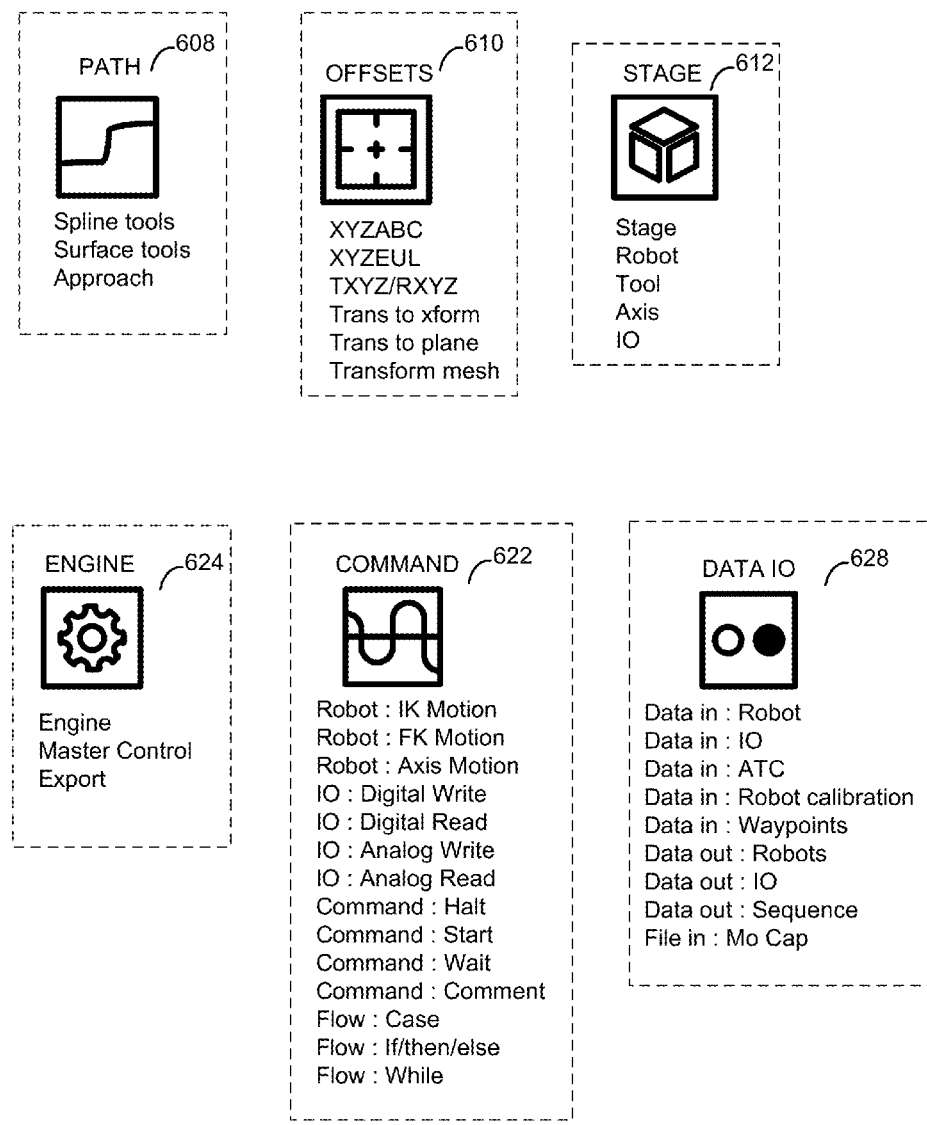
FIG. 6B illustrates an organization of digital tools, according to an example embodiment.
Figure 6C:
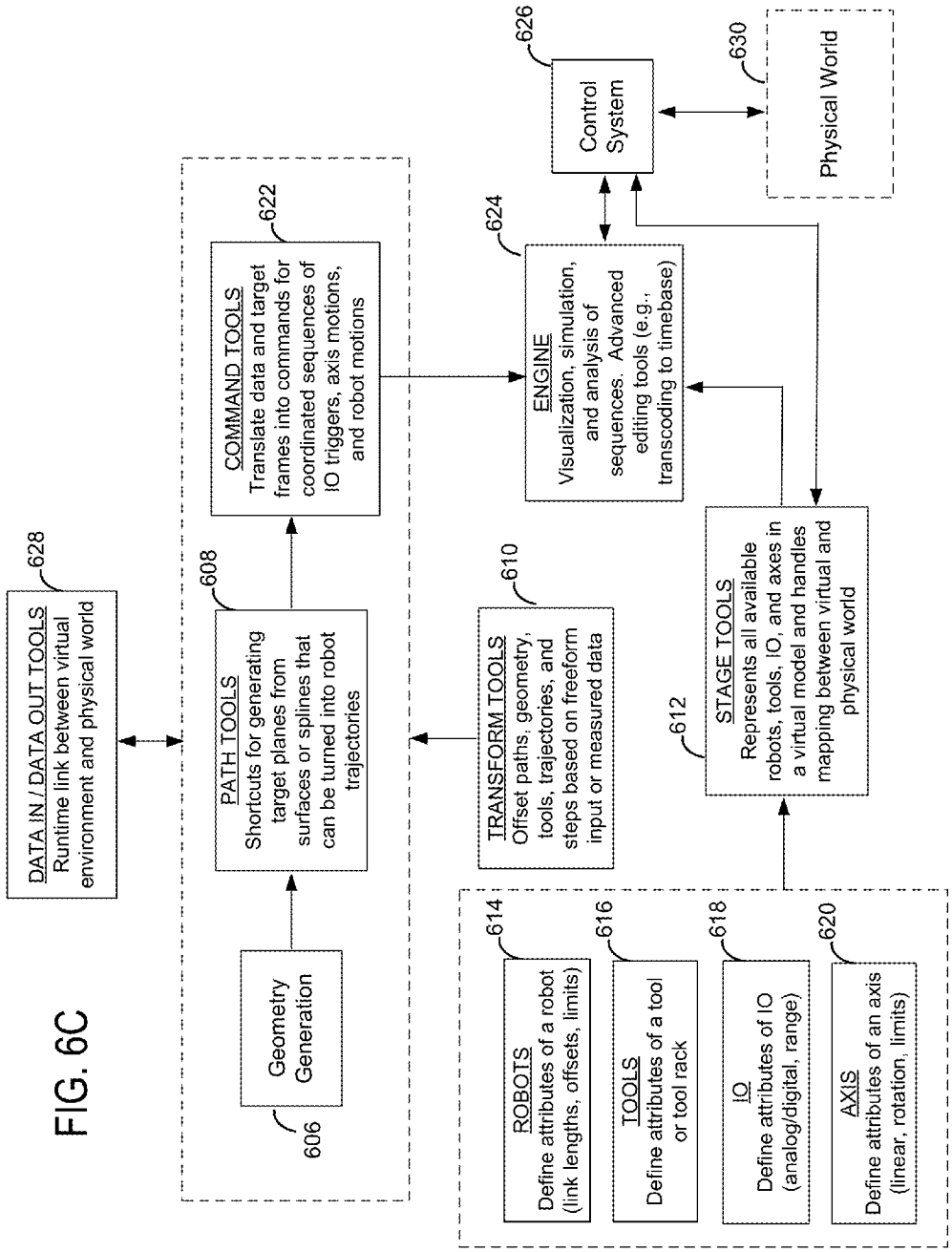
FIG. 6C is a block diagram of an example workflow, according to an example embodiment.

FIG. 6B shows an organization of digital tools within a toolbar, according to an example embodiment. As shown, the digital toots may be divided into a number of different categories. The digital tools may then be used in combination to design a building process, as shown by FIG. 6C. FIG. 6C is a block diagram of an example workflow, according to an example embodiment. In particular, FIG. 6C shows workflow involving a number of digital tools, which may be accessible within a toolbar as depicted in FIG. 6A and FIG. 6B or by another means within a graphical interface. As shown, the digital tools may be divided into a number of different categories. One or more digital tools from a number of different categories may be selected by a user to affect particular aspects of the building process, including the robot actors and other components within a physical workcell that may be used in the process.

In one example, a toolbar may include path tools 608 relating to generating target planes that may be used to determine motion paths of robot actors. In some examples, the path tools 608 may take as input geometry 606 describing a desired output product, such as geometry generated by parametric modeling software, Grasshopper. For instance, the output product geometry 606 may be generated based on user input within an input window specifying aspects of the output geometry including dimensions, density, curvature, materials, and so on. The path tools 608 may then determine target planes for robot motion paths based on the output product geometry 606.

In some examples, the output product geometry 606 may include particular splines, surfaces, and/or other geometrical constructions to be included within an output product. The path tools 608 may then provide shortcuts for generating target planes relating to aspects of the output product in a format that can be turned into particular robot trajectories that may be used to construct an output product containing the target planes. Motion paths fir individual robot actors may then be derived as a function of the target planes in addition to tool definitions and material properties, for example.

In further examples, a toolbar may include transform tools 610 relating to transformations between different axis frames or offsets, as shown by FIG. 6B and FIG. 6C. For instance, the transform tools 610 may provide transformations between coordinate frames at the base or joints of a particular robot and a stage containing the output product. In other examples, the transform tools 610 may additionally allow for transformations between multiple robots operating within different frames of reference as well. As shown in FIG. 6C, transformations may be applied before and/or after determining sequences of motion for individual robot actors.

In further examples, a toolbar may include stage tools 612 that represent aspects of a physical workcell, such as robot actors, tools, IO, and/or axes. In some examples, stage tools 612 may also provide a mapping between virtual robots in software and physical robot actors within the physical workcell, as shown by FIG. 6B and FIG. 6C. The stage tools 612 may be used by engine node 624 to send trajectories for robot actors to take based on output from command tools 622 to a control system 628. In some examples, stage node 612 may be configured in order to specify the currently available robotic devices and/or tools within a particular physical workcell. The control system 626 may then command robot actors and/or other components within the physical world 630 based on information from stage tools 612.

In some examples, stage tools 612 may take input from one or more robot nodes 614 representing attributes of individual robot actors within a physical workcell, as shown by FIG. 6B and FIG. 6C. A robot node 614 may be used to define attributes of a robot actor, such as traditional six-axis robots or other types of robots. The robot attributes may include link lengths of the robot and/or arm lengths of the robot, offsets of the robot and/or joints of the robot, and/or limits on robot joint movement or maximum torque that a robot joint can handle, for example.

In additional examples, stage tools 612 may also take input from one or more tool nodes 616 for defining the attributes of physical building tools and/or a tool rack for holding the tools, as shown by FIG. 6B and FIG. 6C. For example, attributes of building tools such as grippers or spindles may be specified by tool nodes, which may be used to configure an automatic tool changer so that robot actors can easily switch between tools. In some examples, robot actors may switch between tools using a tool rack which stores the tools and facilitates a tool changing process, as described above with respect to FIGS. 3A and 3B.

In further examples, the tool nodes 616 may include support for compound tooling that may allow component tools to be assembled into compound tools. In particular, individual tooling parameters (e.g., wrist mount offsets or tool center points) may be abstracted into components that may be assembled into compound tools. For instance, multiple tools may be aggregated into one compound tool that has multiple tool orientations and/or center points that may be used depending on which component of the tool may be required at a particular time. For example, a compound tool with an automatic tool changer may be represented by a master interface plus a number of different attachments, such as a spindle, a vacuum array, or a gripper. In another example, a compound tool may include a series of different tools, such as a gripper plus a tensioner plus a roller. Other examples of combining multiple tools and/or combining tools by abstracting tooling into parameters that define tool orientation and/or center points are also possible.

In further examples, stage tools 612 may also take input from one or more IO nodes 618. The IO nodes 618 may describe information relating to digital and/or analog input and/or output actions that may be taken by a robot actor, such as the type of action (e.g., gripping a material) and attributes associated with the action (e.g., width of material that can be gripped). In additional examples, the robot attributes may include one or more axis nodes 620. The axis nodes 620 may describe one or more linear and/or rotational axes along which a robot can travel, including limitations on the robot's movements along the axes.

In additional examples, a toolbar may include command tools 622, as shown by FIGS. 6B and 6C. The command tools 622 may be used to determine robot commands to cause one or more of the robot actors to execute particular operations, which may include point-to-point motions, motions along external axes, and/or input or output events. For example, one of command tools 622 may be used to direct a particular robot motion along one of six degrees of freedom, a particular robot motion along an external axis, or a particular input or output event, such as applying glue to a material in a particular manner. Additionally, command tools 622 may be included for creating step nodes that instruct robot actors to take a particular sequence motion steps and carry out one or more tool actions. In further examples, coordinated sequences of motions may be generated for multiple robot actors working together within a single timeframe.

In some examples, step nodes, or sequences of motions and actions, can be abstracted into reusable subroutines. For instance, a subroutine can be defined by connecting visual building blocks, which may represent particular motion commands or motion parameters. The subroutine could then be used to make one or more robots carry out the same action sequence multiple times within a single building process. In some examples, steps can be synchronized across multiple robots so that multiple robots can work in a shared environment simultaneously. Example systems may also include an engine node 624, which may assign each of the steps to particular robotic devices within a stage.

In further examples, users may be provided with functionality to switch between steps within the graphical interface. For instance, timeline 508 as illustrated and described with respect to FIG. 5 may also includes buttons to skip between steps on the timeline. In some examples, digital bookmarks may be inserted by a user for particular steps. For instance, through the graphical interface, it may be possible to jump from the beginning of a "fetch stick" step to the beginning of a "nail stick" step. These bookmarks steps within the timeline may match the steps authored by the user by inputting motion commands, IO commands, and/or other commands in a step node.

Additionally, the engine node 624 may communicate with control system 626. The control system 626 may be a computing device capable of communicating wirelessly with robot actors and/or other components such as sensors within the physical workcell in the physical world 630. In particular, the control system 626 may provide access to real time data streams from all robot actors and devices, which may allow for precise control over the physical workcell at particular points in time. The control system could communicate with some or all of the actors or devices through wired connections or other types of communication channels as well or instead, including previously described network protocols.

In some examples, the control system may additionally contain a physical control interface such as a touchscreen interface that may allow a user to interact with the control system to view live data or modify robot actions in real time. For instance, a stage file containing information about the physical workcell including actors, tools, materials, and environmental setup on the control system 626 may be accessible via a programming interface. A user who is watching a building process within the physical world 630 may then make modifications to the process before it is completed.

In additional examples, a toolbar may include data input/output toots 628 that may allow the control system 626 to send and/or receive data to and/or from the virtual software environment that determines robot motion paths, as shown by FIG. 6B and FIG. 6C. Accordingly; telemetry from the control system 626 may be used to create a live link between the virtual world in software and the physical world 630. For instance, the data input/output tools 628 may be used to process information from the control system 626 relating to the robot actors within the physical workcell and/or other components in the workcell such as sensors. Based on this information about the physical world 630, the virtual robots within software may be updated with real-time feedback from the physical world 630 (e.g., motion paths for robot actors may be determined or modified based on real-time sensor data).

Additionally, the data input/output tools 628 may be used to send data back to the control system 626 so that the control system 626 can effectuate particular input or output actions within the physical world 630, for example. For instance, the control system 626 may instruct a robot actor how use a tool in the physical world 630 (e.g., how to control a spindle) based on information from one or more digital tools within the software interface.

In further examples, engine node 624 include visualizer or simulation tools that may allow a user to simulate a building process through a user interface in software, as shown by FIG. 6B and FIG. 6C. In some examples, the visualizer tools may display the building process as geometry drawn on a screen that shows the physical workcell. In other examples, the visualizer tools may display the building process as curves representing particular data values as well or instead. Additionally, in further examples, the visualizer tools may also be used to visualize a building process in software as it is actually occurring within the physical world 630. In some examples, the visualizer tools may additionally provide a graphical representation of potential conflicts within a particular building process, such as when a robot's motion path extends outside its possible range of motion or when two robot actors may be going to collide based on the currently defined trajectories and/or step sequences.

In further examples, the visualizer component may allow a user to see simulations of the building process in advance and/or as the building takes place. In some examples, the user may use the visualizer component offline to see robotic motion paths as well as input/output events over a series of sequential steps as geometry drawn within a viewing window. In other examples, the user may be able to visualize a simulated playback as numerical data streams relating to the robot actors, materials, and/or other aspects of the physical workcell represented through curves in addition to or instead of visual geometry. In further examples, the user may also be able to see particular data points at individual timesteps, such as robotic joint values, axis values, or input/output values.

In some example systems, a user may also be able to use the visualizer component to visualize a building process that is occurring in the physical world in real time. The system may interface with a control system that receives real-time data streams from sensors that may be used to scan the physical workcell, individual robot actors, and/or parts used in construction as an output product is being built. Accordingly, the visualizer's user interfaces may be updated in real time to reflect real world dimensions, properties, and/or positions of objects and actors within the environment.

VI. EXAMPLE METHODS

A method 700 is provided for instructing robotic devices to operate in a time-based mode within a workcell, according to an example embodiment. In some examples, method 700 may be carried out by a control system, such as manufacture control system 100, master control 10, and/or software control 26 as described in reference to FIG. 1. The control system may communicate with the robot actors using any of the network protocols or communication methods previously described. In additional examples, part or all of method 700 may be executed by any of the graphical interfaces or systems described and illustrated with respect to FIGS. 4A-4B, 5, and 6A-6C. In further examples, part or all of method 700 may be carried out by one or more robotic devices, such as device actors 42, 44 within system devices 40 as described in reference to FIG. 1, or device actor 200 as illustrated and described in reference to FIGS. 2A-2C. Additionally, while examples with certain numbers and types of system devices may be described, various alternative embodiments may include any number and type of robotic devices as well.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 7. Where used, program code can be stored on any type of computer-readable medium, for example, such as a storage device including a disk or hard drive.

Figure 7:
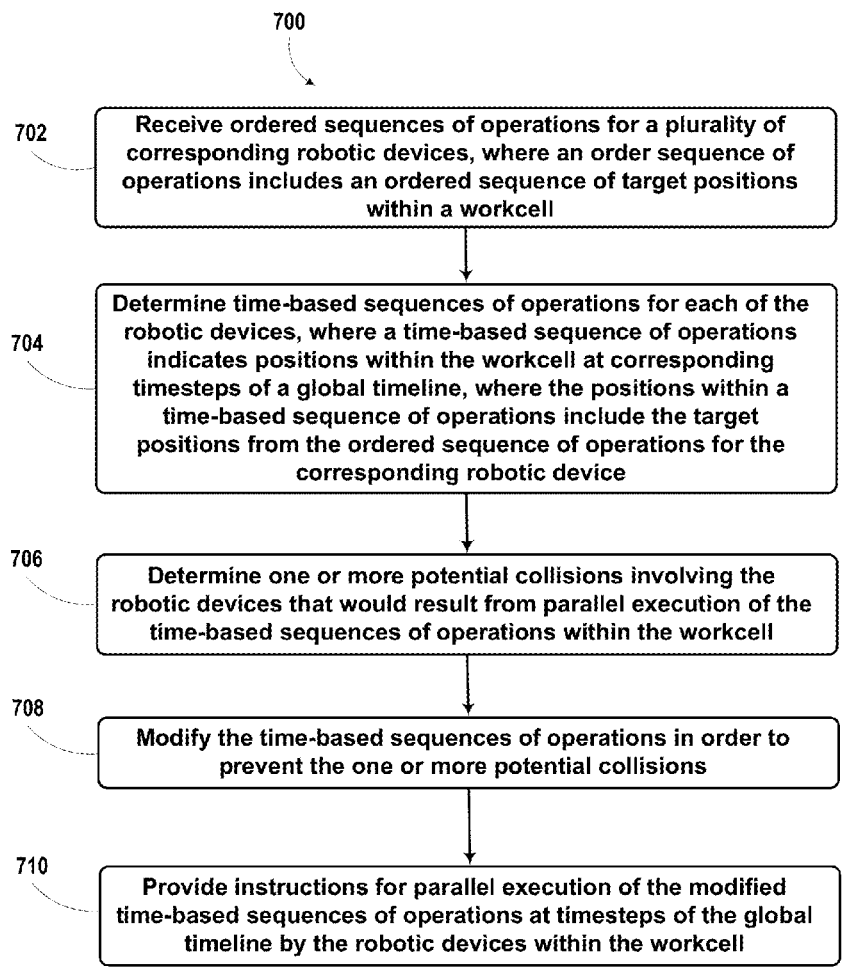
FIG. 7 is a block diagram of an example method, according to an example embodiment.

In addition, each block of the flowchart shown in FIG. 7 may represent circuitry that is wired to perform the specific logical functions in the process. Unless specifically indicated, functions in the flowchart shown in FIG. 7 may be executed out of order from that shown or discussed, including substantially concurrent execution of separately described functions, or even in reverse order in some examples, depending on the functionality involved, so long as the overall functionality of the described method is maintained.

As shown by block 702 of FIG. 7, method 700 may include receiving ordered sequences of operations for a plurality of robotic devices. In particular, an ordered sequence of operations may be determined for each robot actor within a workcell. An ordered sequence of operations for a particular robot may include a sequence of target positions for an end effector of the robot to move through some examples, other types of operations may be interspersed between the motion commands that cause the robot to move between target positions. For example, tool actions may be defined for a robot to activate a physical tool at particular points within its motion paths during a manufacturing process.

In some examples, the ordered sequences of operations for the robotic devices may be generated by a software authoring environment, such as software control 26 as described in reference to FIG. 1. In particular, a user may use a software interface to define sequences of operations for one or more robots to collectively complete a manufacturing or construction process. For example, motion paths and tool actions may be defined for two or three or four robot actors within a workcell in order to construct a physical output product. In further examples, sequences of operations for one or more of the robotic devices may have been defined previously and saved within memory or a computer-readable medium. In some examples, sequences of operations for different robotic devices to perform different parts of a manufacturing process may be created at different times and then combined at a later time for simultaneous execution.

Figure 8A:
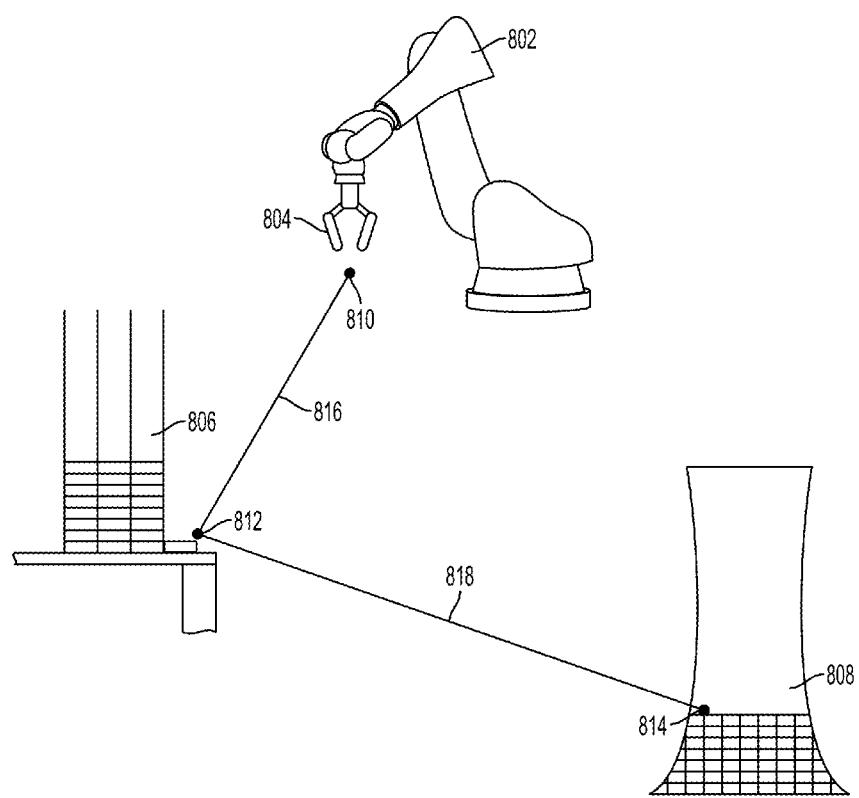
FIG. 8A illustrates an example of sequential robotic operation, according to an example embodiment.

FIG. 8A illustrates an example of sequential robotic operation, according to an example embodiment. More specifically, a robot actor 802 is shown within a workcell used for manufacturing processes. The robot actor 802 could be any of the types of robotic devices previously described. Here, robot actor 802 is equipped with a gripper 804, but other types of tools could be used by robot actor 802 as well or instead. Sequences of operations may be provided for the robot actor 802 to pick up sticks from a pile of sticks 806 and place the sticks onto a stick wall 808 under construction. It should be understood that the scenarios shown here are for illustration purposes and any number of other different types of materials and output products may be used instead.

A sequence of operations for robot actor 802 may include a sequence of target positions 810, 812, 814 for the robot actor 802 to move through (or to move gripper 804 through). The target positions 810, 812, 814 may be translational and rotational positions within the workcell (e.g., with 6 degrees of freedom). In some examples, fewer degrees of freedom may be used for certain robot actors, depending on the robot actor's motion capabilities. In further examples, when operating in sequential mode, robot actor 802 may mow between consecutive target positions with straight lines by default. For example, robot actor 802 may follow path 816 to move between target position 810 and target position 812, and then may follow path 818 to move between target position 812 and target position 814. In additional examples, tool actions may be included within sequences of operations for robot actor 802. For example, a tool action to activate gripper 804 pick up a stick at target position 812 and a second tool action to release gripper 804 to drop the stick at target position 814 may be included within the sequence of operations for robot actor 802.

In further examples, the number of target positions defining motion paths for robot actors may vary within different sequences of operations. For example, additional target positions may be provided to further refine path 816 and path 818 in some examples. In some examples, different granularity may be used for different sequences of operations for robot actors within a workcell as well, possibly depending on the types of tasks assigned to each robot actor.

Method 700 may additionally include determining time-based sequences of operations for each of the robotic devices, as shown by block 704. More specifically, a time-based sequence of operations for a particular robotic device may indicate positions of the robotic device and/or an end effector of the robotic device at corresponding timesteps of a global timeline. The positions within the time-based sequence of operations may include the target positions from the ordered sequence of operations for the corresponding robotic device that was received in block 702. In some examples, other types of robot operations may be included within the time-based sequence of operations from the corresponding received sequence of operations as well. For example, if the sequence of operations caused a robotic device to perform part of a construction process using a tool, the time-based sequence of operations may additionally contain tool actions for the robotic device to activate the tool at particular timesteps of the global timeline as well.

In further examples, a particular time interval may separate consecutive timesteps in each of the time-based sequences of operations. For instance, positions for each of the robotic devices within a workcell may be determined at each timestep (e.g., every 12 milliseconds). In some examples, the interval used may depend on the communication or network capabilities of control systems, such as master control 10 described with respect to FIG. 1, and/or the computing abilities of system devices 40 or corresponding device controllers. In further examples, a control system such as master control 10 may be used to provide instructions to controllers on the robotic devices to position the robotic devices at each timestep. In some examples, a time interval between 10 milliseconds and 20 milliseconds may be used. Other time intervals may be used in different examples as well.

Figure 8B:
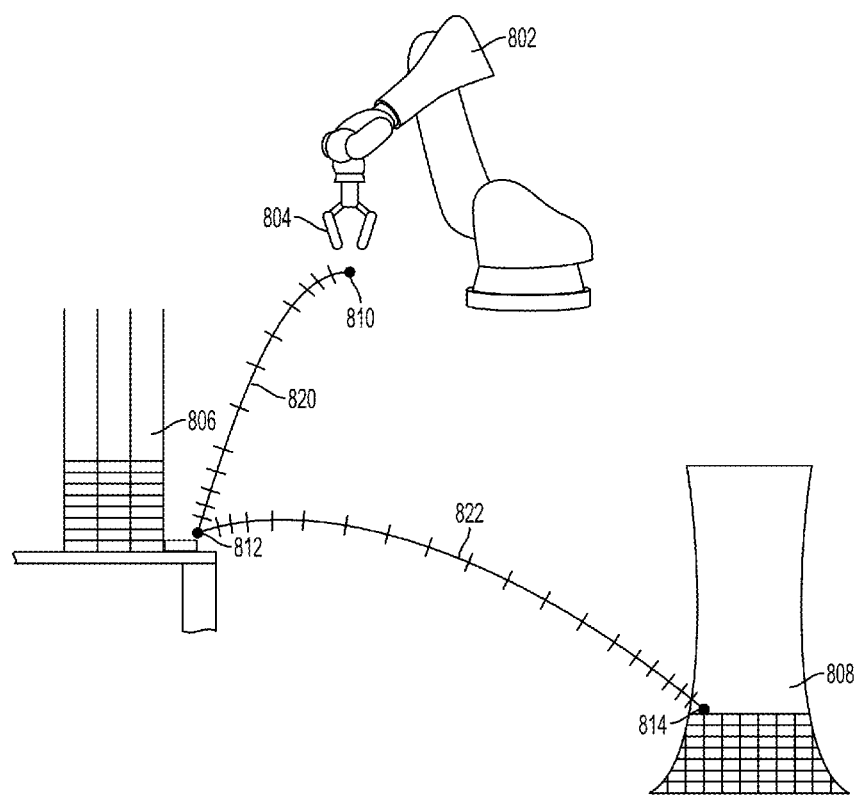
FIG. 8B illustrates an example of time-based robotic operation, according to an example embodiment.

FIG. 8B illustrates an example of time-based robotic operation, according to an example embodiment. More specifically, the sequence of operations including target positions 810, 812, and 814 may be used to determine a time-based sequence of operations for robot actor 802 to move gripper 804 through. The dashes on motion path 820 and motion path 822 may represent the position of gripper 804 (or the end effector of robot actor 802) at timesteps along a global timeline. For example, if a time interval of 12 milliseconds is used in determining the time-based sequences of operations for robot actor 802, then consecutive dashes along motion path 820 and motion path 822 may represent the change in position of gripper 804 during a particular 12-millisecond section of the global timeline.

In some examples, additional positions for the robotic device may be inserted within the time-based sequence of operations between target positions from the received sequential operations. For example, a particular sequence of operations received in block 702 for a robot actor may only contain positions that the robot actor can reach every second or every ten seconds or every minute. However, the time interval used to determine the time-based sequence of operations (e.g., 10 milliseconds or 20 milliseconds or 100 milliseconds) may allow for many more positions to be defined, which may allow for more precise control of a robot's motions. In further examples, different time intervals may be used for different robotic devices as well, possibly depending on the capabilities of hardware or controllers of the different devices.

Referring again to FIG. 8B, positions may be inserted within the time-based sequence of operations for robot actor 802 between target positions 810 and 812 along motion path 820. In some examples, the positions may be chosen to minimize the amount of time spent by robot actor 802 in moving from target position 810 to target position 812. For instance, the positions at each time step may be solved for by solving an optimization problem to minimize the total time usage. In further examples, velocity and/or acceleration curves of robot actor 802 along motion path 820 may be optimized in determining the time-based sequence of operations for a robot actor as well or instead. For instance, maximum velocity curves relative to the global timeline may be determined for each robot actor in an effort to minimize total time usage during a manufacturing process. For example, in FIG. 8B, the velocity of gripper 804 may be maximized in between target positions and then reduced as a target position is approached in order to stop the gripper 804 at the target position.

In additional examples, the positions may be determined in order to minimize the amount of power used by robot actor 802 in moving from target position 810 to target position 812. For example, fluid motion curves may be used instead of rigid point-to-point motions to reduce energy consumption. In further examples, fluid motion curves may also be used to cause a robotic device to simulate physical phenomena more precisely. For instance, a robotic device controlled to replicate the flight of a quadcopter, or a roller coaster ride, or the forces of hitting a surface made of various different materials in order to test the performance of a particular object may all benefit from a more precise time-based description of trajectory.

Method 700 may additionally include determining one or more potential collisions that would result from parallel execution, as shown by block 706. More specifically, the time-based sequences of operations for two or more robotic devices within a workcell may be synchronized to a common clock. The positions of the robotic devices at timesteps along the global timeline may then be used to determine when collisions may result between robotic devices. Possible collisions may include collisions involving two of the robotic devices themselves, collisions involving one or more tools used by the robotic devices, and/or collisions involving materials or products being moved or operated on by one or more of the robotic devices. By using a smaller time interval between consecutive positions for each of the robotic devices along the global timeline, collision detection may be performed with greater confidence.

In further examples, one or more possible collisions may be determined during parallel operation of the robotic devices. For example, due to calibration inaccuracy or unexpected effects from manufacturing operations, the precise position of robotic devices and/or other components within a workcell may not be known until a manufacturing process has started. In such examples, certain possible collisions may be identified and avoided on the fly. In further examples, the time-based sequences of operations for the robotic devices may be determined in stages, with some operations determined during execution. For instance, sequential operations may be used to determine time-based sequences of operations for the robots to execute during the first five minutes of the global timeline. Then, after executing some or all of the operations, another five-minute block of operations may be determined. Determining sequences of operations and/or predicted collisions may be performed at other times or in other combinations in some examples as well.

Figure 8C:
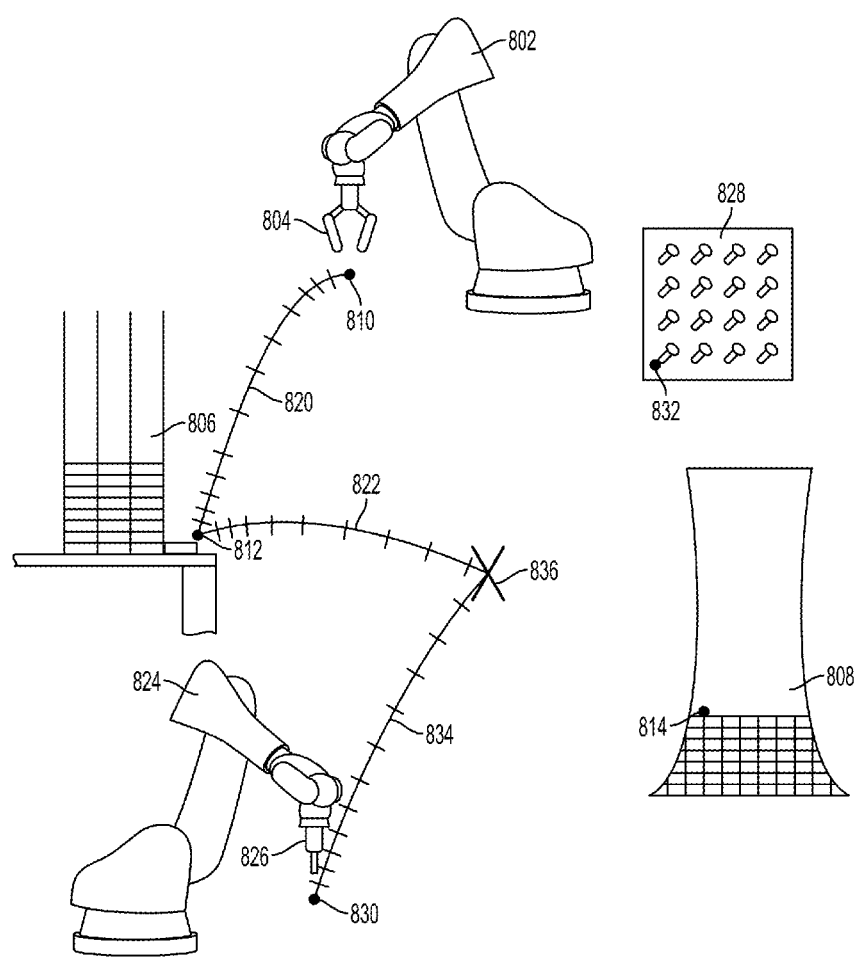
FIG. 8C illustrates motion paths of two robotic devices operating in parallel, according to an example embodiment.

FIG. 8C illustrates motion paths of two robotic devices operating in parallel, according to an example embodiment. More specifically, time-based sequences of operations may be determined for robot actor 802 and robot actor 824 to perform in parallel within a workcell. Robot actor 802 may be equipped with a gripper 804, and robot actor 824 may be equipped with a spindle 826 for use during a manufacturing process. Motion paths 820 and 822 may be determined for robot actor 802 in order to cause robot actor 802 to move its gripper 804 to pick up a stick from a pile of sticks 806 and then place the stick on a stick wall 808. Additionally, motion path 834 may be determined for robot actor 824 to simultaneously move its spindle 826 from a first target position 830 to a second target position 832 located at a box of materials 828. For instance, robot actor 824 may be assigned to pick up screws from a box of screws 828 in order to insert screws into sticks on stick wall 808.

The motion paths 820, 822 for robot actor 802 and the motion path 834 for robot actor 824 may be synchronized to a common clock. More specifically, the dashes along motion paths for each robot actor may represent positions of the robots at timesteps along global timelines. By comparing the positions of each robot actor at particular timesteps, possible collisions between robot actors may be predicted. For example, a possible collision between robot actor 802 and robot actor 824 may be predicted at 836. In some examples, possible collisions may include points at which robotic devices come within a distance of each other that is less than a predetermined safety buffer. For instance, a safety buffer may be used to avoid collisions resulting from imprecision in calibration and/or commanded robot positions.

Method 700 may additionally include modifying at least one of the time-based sequences of operations in order to prevent the identified collisions, as shown by block 708. More specifically, a time-based sequence of operations may be modified by modifying timesteps corresponding to particular operations and/or by inserting, removing, or modifying particular operations within the sequence. In some examples, the time-based sequences of operations may be modified in an effort to minimize the total time required to complete a manufacturing process, or the additional amount of time resulting from ensuring that no collisions result during parallel execution. In further examples, modifications may be determined to minimize usage of other resources (e.g., energy or power) in addition or instead.

Figure 8D:
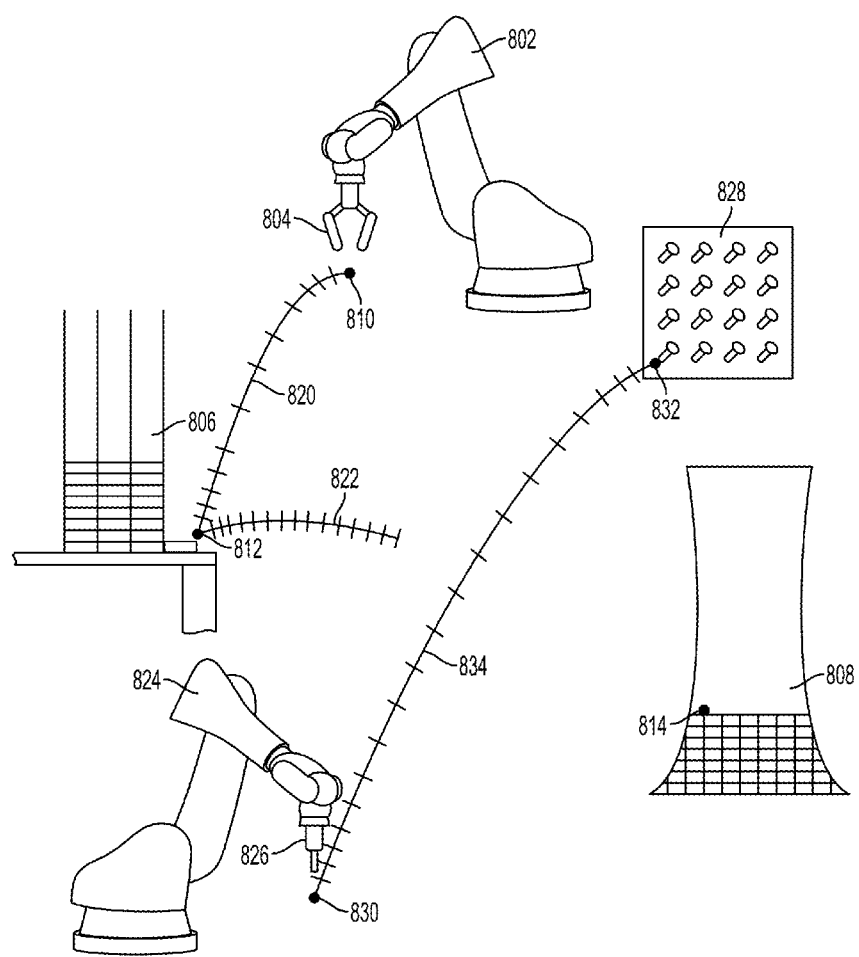
FIG. 8D illustrates alternative motion paths for the robotic devices in FIG. 8C, according to an example embodiment.

In some examples, the rate of operation of one or more of the robotic devices may be modified in order to avoid a collision. For example, referring to FIG. 8D, the rate of operation of robot actor 802 may be slowed down in moving from target position 812 to 814. In particular, the distance between the position of gripper 804 between consecutive timestamps may be reduced, as represented by the shortened distance between dashes along motion path 822. Robot actor 802 may be slowed down in order to ensure that robot actor 824 successfully crosses from target position 830 to 832 without colliding with robot actor 802.

In further examples, robot actors may be controlled to operate with different speeds at different points along the global timeline. In some examples, a velocity curve relative to the global timeline representing the speed of movement or operation of a robotic device at each point in time along the timeline may be determined for each robotic device. Additionally, the velocity curves may be determined that maximize the velocity or rate of operation of each of the devices while avoiding collision. In other examples, velocity and/or acceleration curves may be determined to maximize the combined operating rate of all of the devices when operating in parallel. For instance, the velocity curve of a robot actor whose construction operations take the longest time (and thus limit the time to complete the entire process) may be maximized before determining velocity curves for other robot actors.

Figure 8E:
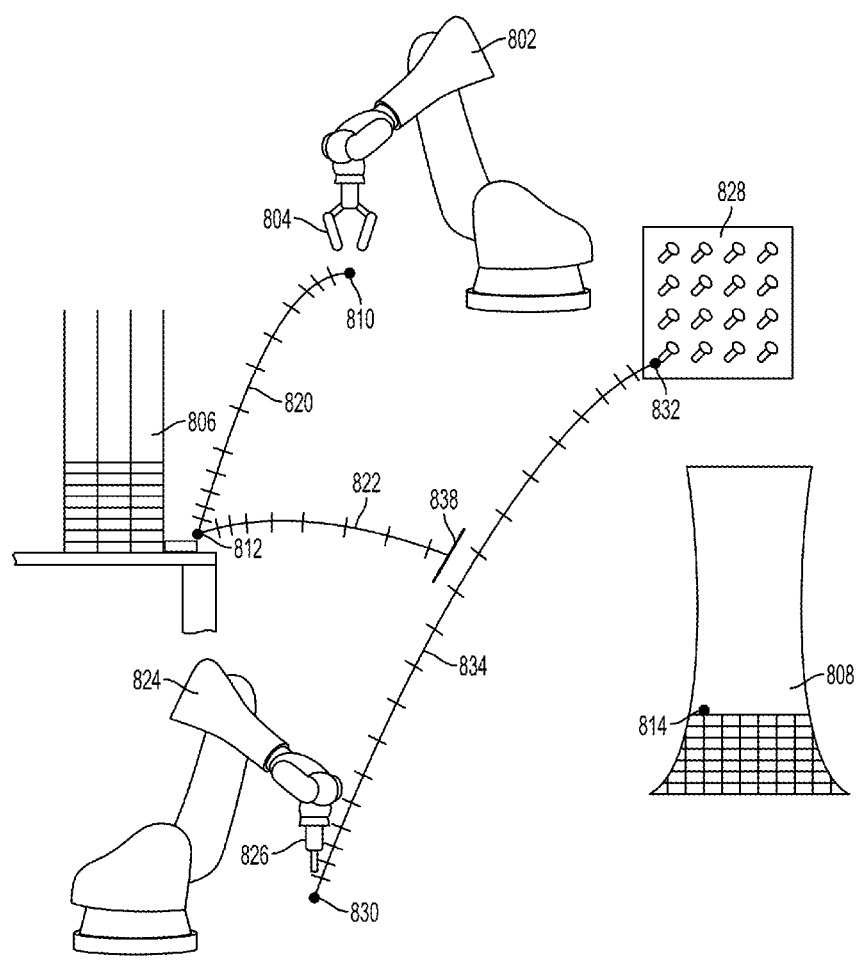
FIG. 8E illustrates further alternative motion paths for the robotic devices in FIG. 8C, according to an example embodiment.

In further examples, one or more operations may be inserted into one or more of the time-based sequences of operations to cause one or more robot actors to hold position for certain periods of time along the global timeline. In particular, instead of or in addition to modifying the rate of operation of one or more robots at one or more points, robots may be commanded to hold position for certain subsections of the global timeline. Referring to FIG. 8E, robot actor 802 may be commanded to hold position at a certain point 838 for one or more timesteps to allow robot actor 824 to pass. As shown in FIG. 8E, the rate of operation of robot actor 802 along motion paths 820 and 822 may not be modified as in FIG. 8D, but a collision may still be avoided by controlling robot actor 804 to hold position at position 838. In additional examples, the option to cause robotic devices to hold position at certain points in time and space may also be considered when determining position, velocity, and/or acceleration curves for the robotic devices to minimize time usage and/or usage of other resources as previously discussed.

In further examples, modifying the time-based sequences of operations may include modifying one or more positions between consecutive target positions in one or more of the time-based sequences as well or instead. For instance, a collision may be avoided between two robotic devices by modifying the motion paths between target positions for one or both of the devices, such as motion path 820, 822, and/or 834 as described with respect to FIG. 8C. In further examples, modifications to positions may be performed in conjunction with any of the timing modifications previously discussed in order to prevent collisions, possibly while optimizing across time and/or other resources.

In additional examples, the sequences of operations received for robotic devices at block 702 of method 700 may include one or more sync points. A sync point may correspond to an operation within the sequence of operations for each robot, and indicate a point that each robot must reach before any of the robots are permitted to continue executing operations. Instructions for industrial robots such as those used in manufacturing processes may often include sync points to ensure that no collisions or other types of interference occur from simultaneous operation by multiple robots within a workcell. In some examples, inefficiencies may result from synch points that require one or more robots to stop and wait for other robots to complete operations within the workcell.

In some examples, a process involving multiple robots and sync points, such as a manufacturing process, can be completed more efficiently when converting to time-based mode. In particular, by performing collision checking at timesteps along the global timeline, some or all of the sync points may be disregarded. Robotic devices may be allowed to continue operation rather than stopping at a sync point, and collisions may be avoided by modifying time-based sequences of operations using any of the methods previously discussed. In some examples, collisions may be avoided more efficiently (in time or a different resource) by solving an optimization problem to determine position, velocity, and/or acceleration curves for the robotic devices rather than requiring strict handshakes at sync points before any robot can continue.

In further examples, some sync points may be preserved when converting to time-based mode. In particular, one or more of the sync points may be identified as anchor points requiring synchronization between two or more robotic devices in time-based mode. In some examples, anchor points may correspond to sync points requiring synchronization for a purpose other than collision avoidance. In further examples, anchor points may corresponding to sync points at which two or more robotic devices are controlled to operate on a single component within the workcell. For instance, during a construction process, a first robotic device may be assigned to hold a board while a second robotic device drives a nail through the board. In such an example, synchronization may be preserved to cause the first robotic device to continue holding the board until the second robotic device finishes nailing the board. In further examples, other synch points which are not identified as anchor points may be disregarded when converting to time-based mode, allowing time-based sequences of operations crossing those points to be fluid and optimized as previously discussed.

Method 700 may additionally include providing instructions for parallel execution of the modified time-based sequences of operations by the robotic devices within the workcell, as shown by block 710. In particular, the time-based sequences of operations for each robotic device as modified to avoid collisions may be synchronized to a single global timeline for execution, in some examples, a control system such as master control 10 as described with respect to FIG. 1 may be used to push the time-based sequences of instructions onto controllers for individual robotic devices for parallel execution (e.g., of a manufacturing process).

In further examples, the time-based sequences of instructions may be determined and/or provided to the robot controllers in blocks or stages (e.g., portions of the timeline). In yet further examples, time-based sequences of instructions may be transmitted to robotic devices and/or controllers for robotic devices using any of the networking or communication methods previously described. In additional examples, some or all of the time-based sequences of operations may be determined and saved (e.g., to a memory or computer-readable medium) for later execution. In further examples, only certain portions of sequences of robot operations may be provided for time-based parallel execution while other portions are provided for sequential execution instead.

VII. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise, the example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. A computer-implemented method comprising:
receiving ordered sequences of operations for a plurality of corresponding robotic devices, wherein an ordered sequence of operations comprises an ordered sequence of target positions within a workcell;

determining, by a computing device, time-based sequences of operations for each of the plurality of corresponding robotic devices, wherein each of the time-based sequences of operations indicates positions of the corresponding robotic device within the workcell at corresponding timesteps of a global timeline, and wherein the positions of the corresponding robotic device within each of the time-based sequences of operations comprise the target positions from the ordered sequences of operations for the corresponding robotic device;

determining one or more potential collisions involving the robotic devices that would result from parallel execution of the time-based sequences of operations within the workcell;

modifying the time-based sequences of operations in order to prevent the one or more potential collisions; and providing instructions to cause parallel execution of the modified time-based sequences of operations at timesteps of the global timeline by the robotic devices within the workcell.

2. The method of claim 1, wherein a particular time interval separates consecutive timesteps of the global timeline.

3. The method of claim 1, wherein the target positions within an ordered sequence of operations comprise positions of an end effector of the corresponding robotic device, wherein the positions of the end effector include six degrees of freedom.

4. The method of claim 1, wherein determining the time-based sequences of operations for each of the plurality of corresponding robotic devices comprises determining, for each of the time-based sequences of operations, positions between consecutive target positions of the corresponding robotic device that minimize an amount of time between timesteps corresponding to the consecutive target positions of the corresponding robotic device.

5. The method of claim 1, wherein modifying the time-based sequences of operations in order to prevent the one or more potential collisions comprises modifying one or more corresponding timesteps of one or more positions within one or more of the time-based sequences of operations.

6. The method of claim 5, further comprising:
inserting operations to cause a certain one of the robotic devices to hold position at a particular position for a subsection of the global timeline; and
increasing one or more corresponding timesteps of one or more positions of the certain robotic device occurring after the particular position by an amount of time corresponding to a length of the subsection of the global timeline.

7. The method of claim 5, wherein modifying the one or more corresponding timesteps of the one or more positions within the one or more of the time-based sequences of operations comprises determining, for each of the robotic devices, a maximum velocity curve at timesteps of the global timeline that does not result in a collision involving two or more of the robotic devices.

8. The method of claim 1, wherein modifying the time-based sequences of operations in order to prevent the one or more potential collisions comprises modifying one or more positions between consecutive target positions within one or more of the time-based sequences of operations.

9. The method of claim 1, wherein the received ordered sequences of operations comprise one or more sync points, wherein a sync point corresponds to an operation within each of the ordered sequences of operations and indicates to cause each of the robotic devices to hold position at an operation corresponding to the sync point until each of the robotic devices reaches an operation corresponding to the sync point; and wherein the method further comprises:
determining one or more anchor points, wherein the one or more anchor points comprise a subset of the one or more sync points; and
determining the time-based sequences of operations so as to cause one or more of the robotic devices to hold position at an operation corresponding to an anchor point until one or more other robotic devices reach an operation corresponding to the anchor point.

10. The method of claim 9, wherein the one or more anchor points correspond to operations for two or more of the robotic devices to operate on a single component within the workcell.

11. The method of claim 1, wherein modifying the time-based sequences of operations in order to prevent the one or more potential collisions comprises modifying positions for one or more of the time-based sequences of operations between consecutive target positions to minimize an amount of time required to carry out the ordered sequences of operations.

12. The method of claim 1, wherein modifying the time-based sequences of operations in order to prevent the one or more potential collisions comprises modifying positions for one or more of the time-based sequences of operations to minimize an amount of power used by the robotic devices.

13. A system comprising:
a non-transitory computer-readable medium; and
program instructions stored on the non-transitory computer-readable medium and executable by at least one processor to:
receive ordered sequences of operations for a plurality of corresponding robotic devices, wherein an ordered sequence of operations comprises an ordered sequence of target positions within a workcell;
determine time-based sequences of operations for each of the plurality of corresponding robotic devices, wherein each of the time-based sequences of operations indicates positions of the corresponding robotic device within the workcell at corresponding timesteps of a global timeline, and wherein the positions of the corresponding robotic device within each of the time-based sequences of operations comprise the target positions from the ordered sequences of operations for the corresponding robotic device;
determine one or more potential collisions involving the robotic devices that would result from parallel execution of the time-based sequences of operations within the workcell;
modify the time-based sequences of operations in order to prevent the one or more potential collisions; and
provide instructions to cause parallel execution of the modified time-based sequences of operations at timesteps of the global timeline by the robotic devices within the workcell.

14. The system of claim 13, wherein a particular time interval separates consecutive timesteps of the global timeline.

15. The system of claim 14, wherein the particular time interval is between 10 milliseconds and 20 milliseconds.

16. The system of claim 13, wherein the program instructions are executable by the at least one processor to determine the time-based sequences of operations for each of the plurality of corresponding robotic devices by determining, for each of the time-based sequences of operations, positions between consecutive target positions of the corresponding robotic device that minimize an amount of time between timesteps corresponding to the consecutive target positions of the corresponding robotic device.

17. The system of claim 13, wherein the program instructions are executable by the at least one processor to determine the time-based sequences of operations for each of the plurality of corresponding robotic devices by determining, for each of the time-based sequences of operations, positions that minimize an amount of power used by the robotic devices.

18. The system of claim 13, wherein the program instructions are executable by the at least one processor to modify the time-based sequences of operations in order to prevent the one or more potential collisions by modifying one or more corresponding timesteps of one or more positions within one or more of the time-based sequences of operations.

19. A non-transitory computer readable medium having stored therein instructions, that when executed by a computing system, cause the computing system to perform functions comprising:

receiving ordered sequences of operations for a plurality of corresponding robotic devices, wherein an ordered sequence of operations comprises an ordered sequence of target positions within a workcell;

determining time-based sequences of operations for each of the plurality of corresponding robotic devices, wherein each of the time-based sequences of operations indicates positions of the corresponding robotic device within the workcell at corresponding timesteps of a global timeline, and wherein the positions of the corresponding robotic device within each of the time-based sequences of operations comprise the target positions from the ordered sequences of operations for the corresponding robotic device;

determining one or more potential collisions involving the robotic devices that would result from parallel execution of the time-based sequences of operations within the workcell;

modifying the time-based sequences of operations in order to prevent the one or more potential collisions; and providing instructions to cause parallel execution of the modified time-based sequences of operations at timesteps of the global timeline by the robotic devices within the workcell.

20. The non-transitory computer-readable medium of claim 19, wherein modifying the time-based sequences of operations in order to prevent the one or more potential collisions comprises modifying one or more positions between consecutive target positions within one or more of the time-based sequences of operations.

* * * * *